(12) United States Patent
Mihara

(10) Patent No.: US 7,436,449 B2
(45) Date of Patent: Oct. 14, 2008

(54) ELECTRONIC IMAGING SYSTEM

(75) Inventor: Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 1006 days.

(21) Appl. No.: 10/618,675

(22) Filed: Jul. 15, 2003

(65) Prior Publication Data

US 2004/0021783 A1 Feb. 5, 2004

(30) Foreign Application Priority Data

Jul. 18, 2002 (JP) ............................ 2002-209560

(51) Int. Cl.
*H04N 7/00* (2006.01)

(52) U.S. Cl. .................. 348/362; 348/240.1; 348/240.3; 348/240.99; 348/305; 348/324; 348/342; 348/360; 348/363; 359/738; 359/739; 359/888; 359/889; 359/894

(58) Field of Classification Search ............ 348/240.99, 348/240.1, 240.3, 303, 305, 317, 322, 324, 348/362, 363, 369, 342, 335, 360; 359/738, 359/739, 740, 894, 888, 889
See application file for complete search history.

(56) References Cited

U.S. PATENT DOCUMENTS

| | | | | | |
|---|---|---|---|---|---|
| 3,971,065 | A | * | 7/1976 | Bayer | 348/276 |
| 4,290,675 | A | * | 9/1981 | Beiser | 396/324 |
| 4,759,347 | A | * | 7/1988 | Ando | 600/109 |
| 5,668,668 | A | | 9/1997 | Shibayama et al. | 359/683 |
| 5,721,642 | A | | 2/1998 | Shibayama et al. | 359/686 |
| 5,798,871 | A | | 8/1998 | Shibayama et al. | 359/684 |
| 6,088,059 | A | * | 7/2000 | Mihara et al. | 348/335 |
| 6,088,169 | A | | 7/2000 | Ohno | 359/682 |
| 6,124,987 | A | | 9/2000 | Kayanuma et al. | 359/692 |
| 6,178,046 | B1 | * | 1/2001 | Broome et al. | 359/618 |
| 6,229,655 | B1 | | 5/2001 | Kohno et al. | 359/689 |
| 6,308,011 | B1 | | 10/2001 | Wachi et al. | 396/72 |
| 6,417,973 | B2 | * | 7/2002 | Mihara et al. | 359/684 |
| 6,741,760 | B2 | * | 5/2004 | Hayashi et al. | 382/321 |
| 6,905,462 | B1 | * | 6/2005 | Homma et al. | 600/176 |
| 6,992,720 | B2 | * | 1/2006 | Kaneda | 348/363 |
| 7,038,722 | B2 | * | 5/2006 | Kitagishi | 348/272 |
| 7,098,955 | B2 | * | 8/2006 | Koyama et al. | 348/363 |

(Continued)

FOREIGN PATENT DOCUMENTS

JP 63-292106 11/1988

(Continued)

*Primary Examiner*—Lin Ye
*Assistant Examiner*—Chriss S Yoder, III
(74) *Attorney, Agent, or Firm*—Kenyon & Kenyon LLP

(57) ABSTRACT

The invention relates to an electronic imaging system such a video camera or digital camera, whose thickness or size is reduced while performance degradation is reduced as much as possible. The system comprises a zoom lens system comprising a first G1, a second G2, a third G3 and a fourth lens group G4 and an aperture stop S, and an electronic image pickup device located on its image side I and covered with a cover glass CG. The image of a subject is formed on the photoreceptive surface of the electronic image pickup device for conversion into electric signals. The system satisfies the following conditions (1) and (2).

$$a \leq 4 \, \mu m \quad (1)$$

$$F > a \quad (2)$$

Here a is the horizontal pixel pitch in μm of the electronic image pickup device and F is the F-number of the zoom lens system at its wide-angle end.

10 Claims, 20 Drawing Sheets

U.S. PATENT DOCUMENTS 7,136,230 B2 * 11/2006 Miyauchi et al. ............ 359/663
7,151,570 B2 * 12/2006 Kaneda ...................... 348/360
2002/0027721 A1 * 3/2002 Mihara ...................... 359/686

FOREIGN PATENT DOCUMENTS

| JP | 3-139607 | 6/1991 |
|---|---|---|
| JP | 3-158817 | 7/1991 |
| JP | 9-211287 | 8/1997 |
| JP | 11-194274 | 7/1999 |
| JP | 2000-137164 | 5/2000 |
| JP | 2000-244799 | 9/2000 |
| JP | 2000-275520 | 10/2002 |

* cited by examiner

C: Cyan  M: Magenta
Ye: Yellow  G: Green

ELECTRONIC IMAGING SYSTEM

This application claims benefits of Japanese Application No. 2002-209560 filed in Japan on Jul. 18, 2002, the contents of which are incorporated herein by this reference.

BACKGROUND OF THE INVENTION

In view of the category of the portable low-end type in particular, the primary object of the present invention is to provide the technology for implementing video or digital cameras whose depth dimension is reduced while high image quality is ensured, and which are easy to handle.

The gravest bottleneck in diminishing the depth dimension of cameras is the thickness of an optical system, especially a zoom lens system from the surface located nearest to its object side to an image pickup plane. Recent technologies for slimming down cameras rely primarily on a collapsible lens mount that allows the optical system to be taken out of a camera body for phototaking and received therein for carrying. Typical examples of the zoom lens system so far known to be well fit for electronic image pickup devices and have satisfactory image-formation performance inclusive of zoom ratio, angle of view and F-number are disclosed in JP-A's 11-287953, 2000-267009 and 2000-275520.

SUMMARY OF THE INVENTION

According to one aspect of the present invention, there is provided an electronic imaging system comprising a zoom lens system and an electronic image pickup device located on its image side so that the image of a subject can be formed on the photoreceptive surface of the electronic image pickup device for conversion into electric signals, wherein:

a stop has a constantly fixed aperture shape, and the following conditions (1) and (2) are satisfied:

$$a \leq 4 \mu m \quad (1)$$

$$F > a \quad (2)$$

where a is the horizontal pixel pitch in μm of the electronic image pickup device and F is the F-number of the zoom lens system at its wide-angle end.

Another aspect of the present invention, there is provided an electronic imaging system comprising a zoom lens system and an electronic image pickup device located on its image side so that the image of a subject can be formed on the photoreceptive surface of the electronic image pickup device for conversion into electric signals, wherein:

the following conditions (1) and (2) are satisfied:

$$a \leq 4 \mu m \quad (1)$$

$$F > a \quad (2)$$

where a is the horizontal pixel pitch in μm of the electronic image pickup device and F is the F-number of the zoom lens system at its wide-angle end, and the mode of reading signals from the electronic image pickup device has a sequential reading function.

Advantages of, and requirements for, the aforesaid arrangements in the present invention are now explained. As the pixel pitch becomes small in such a range that the relation between the full-aperture F-number (minimum F-number) and the pixel pitch a (μm) of the electronic image pickup device used satisfies $a \leq 4 \mu m$ ... (1) and $F > a$ ... (2), there is little frequency component greater than Nyquist frequency under the influence of diffraction and so little or no image degradation due to alias.

To prevent image degradation due to alias while contrast lower than Nyquist frequency is maintained as much as possible, a so-called optical low-pass filter (LPF) is located between a subject and an image pickup device and on the optical path of an optical system, so that a subject image formed by a lens is displaced roughly by a pixel pitch using the double-refraction action of a uniaxial crystal such as rock crystal into a double image, thereby reducing contrast in the vicinity of the Nyquist frequency component.

However, where the aforesaid conditions (1) and (2) are satisfied, it is unnecessary to locate any optical low-pass filter. It is thus possible to reduce the thickness of the lens barrel with the zoom lens received therein (as measured along the optical axis) by a space corresponding to the optical low-pass filter. Especially when reflecting surfaces are incorporated in the zoom lens system, the optical path can be so bent that the system can be made much thinner. With the aforesaid arrangements that allow any optical low-pass filter to be dispensed with, it is thus possible to reduce the whole size of the system while satisfactory image quality is ensured.

In addition, if the aperture stop used in the lens system is limited to only two types, i.e., full aperture at which there is large degradation due to geometrical aberrations and an f-number in the vicinity of diffraction limited, image quality degradation due to alias responsible for the absence of the optical low-pass filter is then more reduced. The reasons are now explained.

Rayleigh critical frequency is roughly given by $$1/1.22F\lambda$$

where F is the F-number of the image pickup lens used and λ is the wavelength of the light used (nm).

On the other hand, the resolution limit of an image pickup device having a plurality of pixels is given by ½a where a is the horizontal pixel pitch. To prevent Rayleigh critical frequency from becoming lower than the resolution limit of the image pickup device, it is thus a requisite to satisfy $$1.22F\lambda < 2a \quad (a),$$

$$\text{i.e., } F < 1.64a/\lambda \quad (b)$$

Suppose here that the wavelength used is set at λ=546 (nm) in view of visible light photography. Then, the condition for F-number theoretical limit is given by $$F < 3.0 \times 10^3 \times a/1 \text{ mm} \quad (c)$$

In view of such situations, when the F-number upon stopping-down lies in the vicinity of $$3.0 \times 10^3 \times a/1 \text{ mm} \quad (d)$$

it is possible to reduce the influence of diffraction and make the range of light quantity control wide. Here, the maximum F-number upon stopping-down is defined by (maximum F-number at the wide-angle end+maximum F-number at the telephoto end)/2

This value is hereinafter called F'. It is then preferable to satisfy $$2.0 \times 10^3 \times a/1 \text{ mm} < F' < 4.5 \times 10^3 \times a/1 \text{ mm} \quad (3)$$

In this condition, as the F-number decreases upon stopping-down below the lower limit, the range of light quantity control becomes narrow. As the upper limit is exceeded, on the other hand, the F-number upon stopping-down becomes large, resulting in image degradation due to the influence of diffraction. In particular, the aperture shape of the stop should preferably be limited to two types, i.e., a full aperture state and a state where the F-number (F') satisfying the aforesaid condition is obtained.

Typically in the present invention, F' is set at $$F'=(5.60+9.10)/2=7.35 \quad (4)$$

$$F'/(a/1\text{ mm})=[7.35/(2.5\text{ μm}/1\text{ mm})]=2.94\times10^3 \quad (5)$$

The ratio between the maximum F-number at the wide-angle end (maximum F-number) and the minimum F-number at the telephoto end is set at $$\text{Max. }F_w/\text{Min. }F_w=5.60/2.80=2.00 \quad (6)$$

Preferably, the ratio between the maximum F-number and the minimum F-number should be in the range of 1.4 to 3 inclusive. For the same reason, it is acceptable to fix the f-stop number to one value. In that case, the thickness of the lens barrel with the zoom lens received therein can be much more reduced because any space for insertion and de-insertion of the stop is removed in addition to removal of LPF.

In addition, if lens surfaces adjacent to the aperture stop are configured in such a way that at least one thereof is convex toward the aperture stop and another passes through the aperture stop, further size reductions are then achievable because any extra space taken up by the aperture stop is completely eliminated.

Referring to the relation between the full-aperture F-number at the wide-angle end and the pixel pitch a (μm) of the electronic image pickup device, when an electronic image pickup device in such a level as to satisfy the aforesaid conditions $a\leq 4$ μm (1) and F>a (2) is used, it is preferable that the mode of reading signals from the image pickup device has a sequential reading function.

In the case of the interlaced scanning mode in particular, the sequential reading of signals should preferably be performed using only one of odd-number fields or even-number fields. Alternatively, signals at the n line and n+1 line at a certain row (where n is either one of an even number and an odd number) should be read in a mixed fashion. The reasons are given below.

Increases in the number of movable parts such as variable internal diameter stops, stops with interchangeable internal diameters and interchangeable NDs in the optical path require extra space for prevention of mechanical interferences, even with the so-called collapsible lens mount that allows an optical system to be taken out of a camera body for phototaking purposes and to be received in the camera body for carrying purposes. The use of a fixed ND also causes the lens mount with the optical system received therein to become long by its thickness.

To perform control of light quantity with a stop of fixed or uninterchangeable internal diameter but without recourse to an ND filter, all the control of light quantity is preferably performed by control of shutter speed. To increase aperture efficiency, however, the interlaced scanning mode is favorable for practical image pickup devices with an increasing number of pixels, and so a mechanical shutter is used in such a way that two fields, i.e., an odd-number field and an even-number field are simultaneously phototaken and signals are separately read.

However, since the upper limit to shutter speed is determined by the speed of the mechanical shutter (about 1/1,000 second), the mechanical shutter cannot be used for extremely bright subjects. It is thus preferable to make use of a method for using only one field or mixing two fields together for phototaking and reading, although there is a drop of vertical resolution. According to this method, it is unnecessary to read both the odd-number and even-number fields separately, i.e., use the mechanical shutter. In other words, it is possible to use a shutter that enables the potential of an image pickup device to be controlled at a very fast speed (hereinafter called a device shutter), thereby achieving a shutter speed faster than 1/10,000 second.

It is then preferable to select either of the mechanical shutter and the device shutter depending on shutter speed. Dispensing with the mechanical shutter makes the space for it unnecessary, so that the thickness of the zoom lens received at the lens mount can be much more reduced, and the number of parts can be decreased to achieve further size reductions.

It is here noted that the zoom lens system of the present invention comprises, in order from its object side, a lens group Ax having negative refracting power and a lens group Bx having positive refracting power, and consists of up to 5 lenses in all. For zooming, the lens groups Ax and Bx move. To cut down the length of the zoom lens system upon received at a collapsible lens mount, the lens group Bx should preferably consist of up to two lens components (provided that a cemented lens is counted as one component). More preferably, the zoom lens system should consist of only two movable lens groups, i.e., the lens group Ax having negative refracting power and the lens group Bx having positive refracting power.

Next, how and why the thickness of infrared cut filters is reduced is now explained. In an electronic imaging system, an infrared absorption filter having a certain thickness is usually inserted between an image pickup device and the object side of a zoom lens, so that the incidence of infrared light on the image pickup plane is prevented. Here consider the case where this filter is replaced by a coating devoid of thickness so as to reduce the length and thickness of the optical system. In addition to the fact that the system becomes thin as a matter of course, there are spillover effects.

This is now explained. When a near-infrared sharp cut coat having a transmittance ($\tau_{600}$) of at least 80% at 600 nm and a transmittance ($\tau_{700}$) of up to 8% at 700 nm is introduced between the image pickup device in the rear of the zoom lens system and the object side of the zoom lens system, the transmittance at a near-infrared area of 700 nm or longer is relatively lower and the transmittance on the red side is relatively higher as compared with those of the absorption type, so that the tendency of bluish purple to turn into magenta—a defect of a CCD or other solid-state image pickup device having a complementary colors filter—is diminished by gain control and there can be obtained color reproduction comparable to that by a CCD or other solid-state image pickup device having a primary colors filter. In addition, it is possible to improve on color reproduction of, to say nothing of primary colors and complementary colors, objects having strong reflectivity in the near-infrared range, like plants or the human skin.

Thus, it is preferable to satisfy the following conditions (7) and (8):

$$\tau_{600}/\tau_{550}\geq 0.8 \quad (7)$$

$$\tau_{700}/\tau_{550}\leq 0.08 \quad (8)$$

where $\tau_{550}$ is the transmittance at 550 nm wavelength.

More preferably, the following conditions (7)' and/or (8)' should be satisfied:

$$\tau_{600}/\tau_{550}\geq 0.85 \quad (7)'$$

$$\tau_{700}/\tau_{550}\leq 0.05 \quad (8)'$$

Even more preferably, the following conditions (7)" or (8)" should be satisfied:

$$\tau_{600}/\tau_{550} \geq 0.9 \quad (7)''$$

$$\tau_{700}/\tau_{550} \leq 0.03 \quad (8)''$$

Most preferably, both conditions (7)" and (8)" should be satisfied.

Another defect of the CCD or other solid-state image pickup device is that the sensitivity to the wavelength of 550 nm in the near ultraviolet range is considerably higher than that of the human eye. This, too, makes noticeable chromatic blurring at the edges of an image due to chromatic aberrations in the near-ultraviolet range. Such color blurring is fatal to a compact optical system. Accordingly, if an absorber or reflector is inserted onto the optical path, which is designed such that the ratio of the transmittance ($\tau_{400}$) at 400 nm wavelength to that ($\tau_{550}$) at 550 nm wavelength is less than 0.08 and the ratio of the transmittance ($\tau_{440}$) at 440 nm wavelength to that ($\tau_{550}$) at 550 nm wavelength is greater than 0.4, it is then possible to considerably reduce noises such as chromatic blurring while the wavelength range necessary for color reproduction (satisfactory color reproduction) is kept intact.

It is thus preferable to satisfy the following conditions (9) and (10):

$$\tau_{400}/\tau_{550} \leq 0.08 \quad (9)$$

$$\tau_{440}/\tau_{550} \geq 0.4 \quad (10)$$

More preferably, the following conditions (9)' and/or (10)' should be satisfied.

$$\tau_{400}/\tau_{550} \leq 0.06 \quad (9)'$$

$$\tau_{440}/\tau_{550} \geq 0.5 \quad (10)'$$

Even more preferably, the following condition (9)" or (10)" should be satisfied.

$$\tau_{400}/\tau_{550} \leq 0.04 \quad (9)''$$

$$\tau_{440}/\tau_{550} \geq 0.6 \quad (10)''$$

Most preferably, both condition (9)" and (10)" should be satisfied.

It is noted that these filters should preferably be located between the image-formation optical system and the image pickup device.

On the other hand, a complementary colors filter is higher in substantial sensitivity and more favorable in resolution than a primary colors filter-inserted CCD due to its high transmitted light energy, and provides a great merit when used in combination with a small-size CCD. It is also desirable to locate an optical element having a transmittance of up to 90% (where possible, the entrance and exit surfaces of the optical element should preferably be defined by planar surfaces) in a space including the optical axis at least one lens away from the aperture stop or use means for replacing that optical element by another element having a different transmittance.

Alternatively, the electronic imaging system is designed in such a way as to have a plurality of apertures each of fixed aperture size, one of which can be inserted into any one of optical paths between the lens surface located nearest to the image side of the first lens group and the lens surface located nearest to the object side of the third lens group and can be replaced with another as well, so that the illuminance on the image plane can be adjusted. Then, media whose transmittances with respect to 550 nm are different but less than 80% are filled in some of the plurality of apertures for light quantity control. Alternatively, when control is carried out in such a way as to provide a light quantity corresponding to such an F-number as given by a (µm)/F-number<4.0, it is preferable to fill the apertures with medium whose transmittance with respect to 550 nm are different but less than 80%.

In the range of the full-aperture value to values deviating from the aforesaid condition as an example, any medium is not used or dummy media having a transmittance of at least 91% with respect to 550 nm are used. In the range of the aforesaid condition, it is preferable to control the quantity of light with an ND filter or the like, rather than to decrease the diameter of the aperture stop to such an extent that the influence of diffraction appears. In the present invention, the medium on the optical path between the zoom lens system and the electronic image pickup device is all composed only of air or a non-crystalline medium showing anisotropy. For the non-crystalline medium showing anisotropy, for instance, glasses or plastics may be used.

It is understood that only the upper limit or only the lower limit may be applied to each of the above conditions, and that the values of these conditions in each of the following example may be extended as far as the upper or lower limits thereof.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

BRIEF DESCRIPTION OF THE DRAWINGS

FIG. 20(c) is a sectional view of a phototaking optical system in the same.

DESCRIPTION OF THE PREFERRED EMBODIMENTS

Figure 1A:
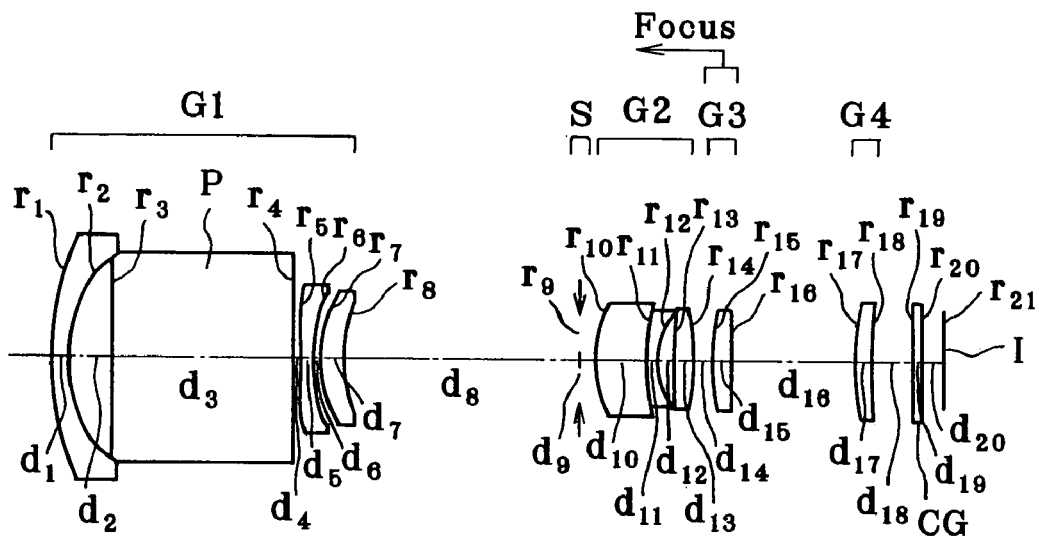
FIGS. 1(a), 1(b) and 1(c) are illustrative in section of Example 1 of the zoom lens according to the invention at the wide-angle end (a), in an intermediate state (b) and at the telephoto end (c), respectively, when the zoom lens is focused on an object point at infinity.
Figure 1B:
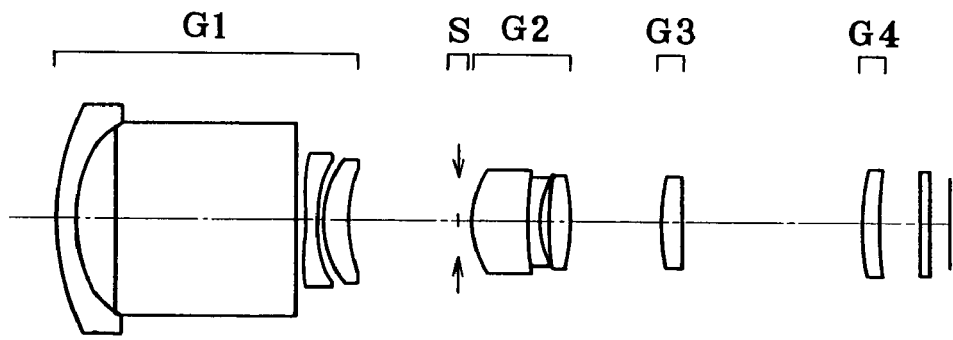
Figure 1C:
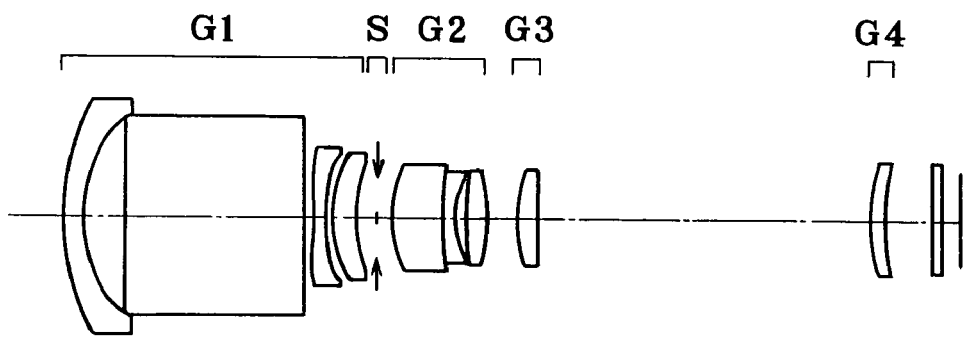
Figure 2:
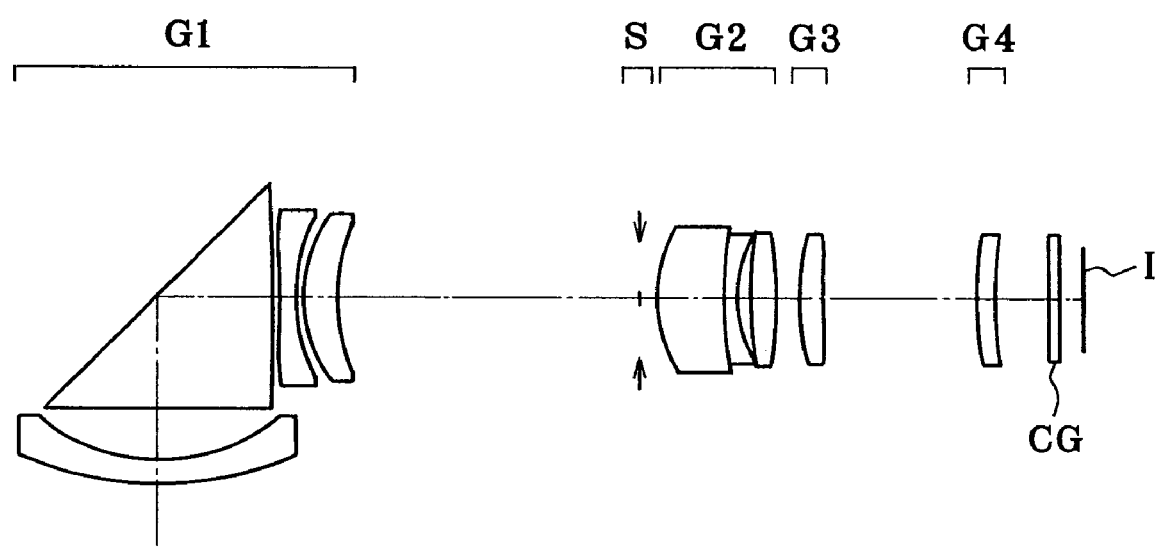
FIG. 2 is illustrative in section of Example 1 of the zoom lens of the invention upon bending at the wide-angle end when the zoom lens is focused on an infinite object point.

Example 1 of the zoom lens according to the invention is now explained. Sectional lens configurations of Example 1 at the wide-angle end (a), in the intermediate state (b) and at the telephoto end (c) upon focused on an object point at infinity are shown in FIGS. 1(a), 1(b) and 1(c). Throughout FIGS. 1(a), 1(b) and 1(c), the first lens group is indicated by G1, the second lens group by G2, a stop by S, the third lens group by G3, the fourth lens group by G4, a cover glass for an electronic image pickup device CCD by CG, and the image plane of CCD by I. A plane-parallel plate or the taken-apart optical path-bending prism in the first lens group G1 is indicated by P. It is noted that in addition to the near-infrared sharp cut coat, it is acceptable to use an infrared cut absorption filter or a transparent plane plate with a near-infrared sharp cut coat applied on its entrance surface. As shown typically in FIG. 2 that is an optical path diagram for Example 1 of the zoom lens upon focused on an infinite object point at the wide-angle end, the optical path-bending prism P is configured as a reflecting prism for bending the optical path through 90°.

EXAMPLE 1

As shown in FIGS. 1(a), 1(b) and 1(c), Example 1 is directed to a zoom lens made up of a first lens group G1 composed of a negative meniscus lens element convex on its object side, an optical path-bending prism P, a double-concave negative lens and a positive meniscus lens convex on its object side, an aperture stop S, a second lens group G2 composed of a doublet consisting of a positive meniscus lens convex on its object side and a negative meniscus lens convex on its object side and a double-convex positive lens, a third lens group G3 composed of one positive meniscus lens convex on its object side and a fourth lens group G4 composed of one positive meniscus lens convex on its object side. Upon zooming from the wide-angle end to the telephoto end of the zoom lens, the first lens group G1 and the fourth lens group G4 remain fixed, and the aperture stop S, the second lens group G2 and the third lens group G3 move toward the object side. For focusing on a nearby subject, the third lens group G3 moves toward the object side. Five aspheric surfaces are used; one at the image side-surface of the negative meniscus lens convex on its object side in the first lens group G1, two at both the surfaces of the double-concave lens in the first lens group G1, one at the surface located nearest to the object side in the second lens group G2, and one at the surface facing the object side in the fourth lens group G4.

The numerical data on each example are given below. Symbols used hereinafter but not hereinbefore have the following meanings:

f: focal length of the zoom lens system
$F_{NO}$: F-number
ω: half angle of view
WE: wide-angle end
ST: intermediate state
TE: telephoto end
$r_1, r_2, \ldots$: radius of curvature of each lens surface
$d_1, d_2, \ldots$: spacing between the adjacent lens surfaces
$n_{d1}, n_{d2}, \ldots$: d-line refractive index of each lens
$v_{d1}, v_{d2}, \ldots$: Abbe number of each lens Here let x be an optical axis on condition that the direction of propagation of light is positive and y be a direction orthogonal to the optical axis. Then, aspheric configuration is given by $$x=(y^2/r)/[1+\{1-(K+1)(y/r)^2\}^{1/2}]+A_4 y^4+A_6 y^6+A_8 y^8+A_{10} y^{10}$$

where r is a paraxial radius of curvature, K is a conical coefficient, and $A_4, A_6, A_8$ and $A_{10}$ are the fourth, sixth, eighth and tenth aspheric coefficients, respectively.

| | | | |
|---|---|---|---|
| $r_1$ = 20.9756 | $d_1$ = 1.1000 | $n_d$ = 1.69350 | $v_{d1}$ = 53.21 |
| $r_2$ = 9.4120 (Aspheric) | $d_2$ = 3.0000 | | |
| $r_3$ = ∞ | $d_3$ = 12.5000 | $n_d$ = 1.80610 | $v_{d1}$ = 40.92 |
| $r_4$ = ∞ | $d_4$ = 0.4000 | | |
| $r_5$ = −24.1584 (Aspheric) | $d_5$ = 0.9000 | $n_d$ = 1.69350 | $v_{d1}$ = 53.21 |
| $r_6$ = 19.1724 (Aspheric) | $d_6$ = 0.4000 | | |
| $r_7$ = 7.6644 | $d_7$ = 1.9000 | $n_d$ = 1.84666 | $v_{d1}$ = 23.78 |
| $r_8$ = 10.3296 | $d_8$ = (Variable) | | |
| $r_9$ = ∞ (Stop) | $d_9$ = 1.0000 | | |
| $r_{10}$ = 7.2754 (Aspheric) | $d_{10}$ = 3.9827 | $n_d$ = 1.74320 | $v_{d1}$ = 49.34 |
| $r_{11}$ = 21.4424 | $d_{11}$ = 0.7000 | $n_d$ = 1.84666 | $v_{d1}$ = 23.78 |
| $r_{12}$ = 6.8156 | $d_{12}$ = 0.8000 | | |
| $r_{13}$ = 20.8730 | $d_{13}$ = 1.5000 | $n_d$ = 1.72916 | $v_{d1}$ = 54.68 |
| $r_{14}$ = −30.7312 | $d_{14}$ = (Variable) | | |
| $r_{15}$ = 14.1761 | $d_{15}$ = 1.4000 | $n_d$ = 1.48749 | $v_{d1}$ = 70.23 |
| $r_{16}$ = 206.1638 | $d_{16}$ = (Variable) | | |
| $r_{17}$ = 17.4404 (Aspheric) | $d_{17}$ = 1.2000 | $n_d$ = 1.49236 | $v_{d1}$ = 57.86 |
| $r_{18}$ = 37.3185 | $d_{18}$ = 2.3900 | | |
| $r_{19}$ = ∞ | $d_{19}$ = 0.6000 | $n_d$ = 1.51633 | $v_{d1}$ = 64.14 |
| $r_{20}$ = ∞ | $d_{20}$ = 1.3596 | | |
| $r_{21}$ = ∞ (Image Plane) | | | |

-continued

Aspherical Coefficients

Second surface
$K = 0$
$A_4 = -7.0154 \times 10^{-5}$
$A_6 = -7.0164 \times 10^{-7}$
$A_8 = -1.4330 \times 10^{-8}$
$A_{10} = 0.0000$ 5th surface
$K = 0$
$A_4 = -1.2550 \times 10^{-3}$
$A_6 = -1.8493 \times 10^{-5}$
$A_8 = 1.8668 \times 10^{-7}$
$A_{10} = 0.0000$ 6th surface
$K = 0$
$A_4 = 1.4852 \times 10^{-3}$
$A_6 = -1.1617 \times 10^{-5}$
$A_8 = 2.8181 \times 10^{-7}$
$A_{10} = 0.0000$ 10th surface
$K = 0$
$A_4 = -1.6552 \times 10^{-4}$
$A_6 = 2.4503 \times 10^{-6}$
$A_8 = -2.3665 \times 10^{-7}$
$A_{10} = 0.0000$ 17th surface
$K = 0$
$A_4 = -2.6614 \times 10^{-4}$
$A_6 = 7.0171 \times 10^{-6}$
$A_8 = -3.8288 \times 10^{-7}$
$A_{10} = 0.0000$ Zooming Data ($\infty$)

|  | WE | ST | TE |
|---|---|---|---|
| f (mm) | 6.00332 | 10.39732 | 17.99812 |
| $F_{NO}$ | 2.8012 | 3.5601 | 4.5471 |
| $2\omega$ (°) | 32.6 | 19.4 | 11.3 |
| $d_8$ | 17.12225 | 8.06116 | 1.49972 |
| $d_{14}$ | 1.39980 | 6.51338 | 2.30699 |
| $d_{16}$ | 8.84122 | 12.79373 | 23.55661 |

Figure 3A:
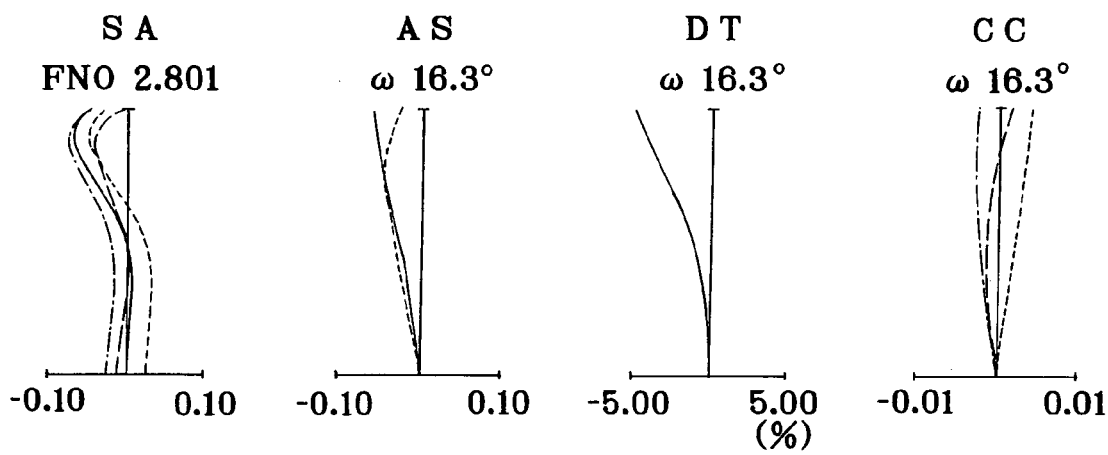
FIGS. 3(a), 3(b) and 3(c) are aberration diagrams for Example 1 when it is focused on an infinite object point.
Figure 3B:
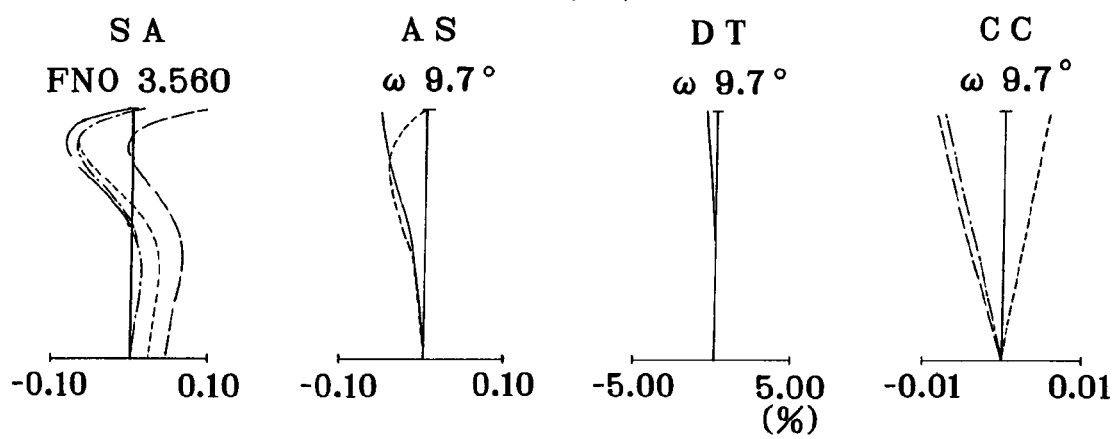
Figure 3C:
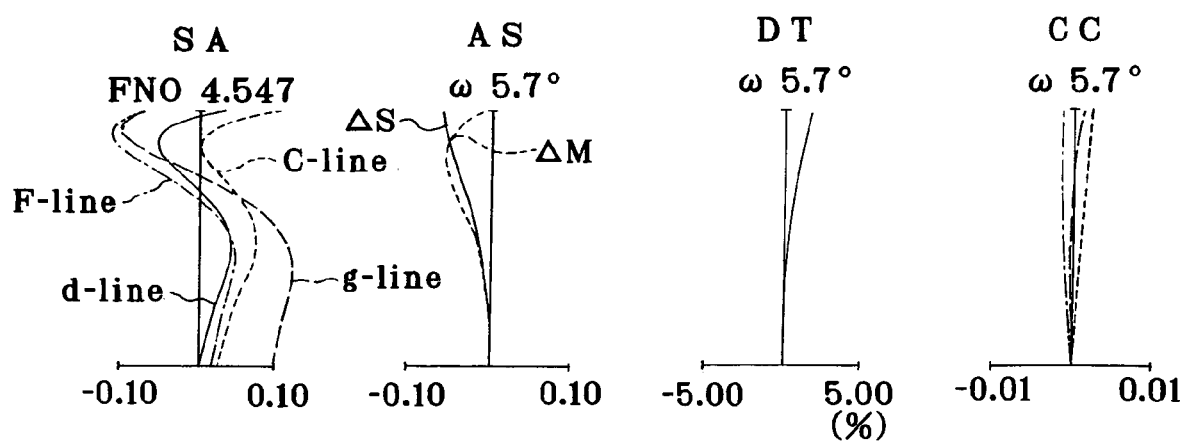

FIGS. 3(a), 3(b) and 3(c) are aberration diagrams for Example 1 upon focused on an infinite object point, wherein (a), (b) and (c) represent spherical aberrations SA, astigmatism AS, distortion DT and chromatic aberration of magnification CC at the wide-angle end, in the intermediate state and at the telephoto end, respectively.

FIGS. 4-10 are illustrative of the horizontal wave optics MTF (modulation transfer function) characteristics of the central areas of the respective screens. Here the F-number at the wide-angle end is 2.80, and the horizontal pixel pitch of the image pickup device used is 2.5 μm (Nyquist frequency 200 cycles/mm).

Figure 4:
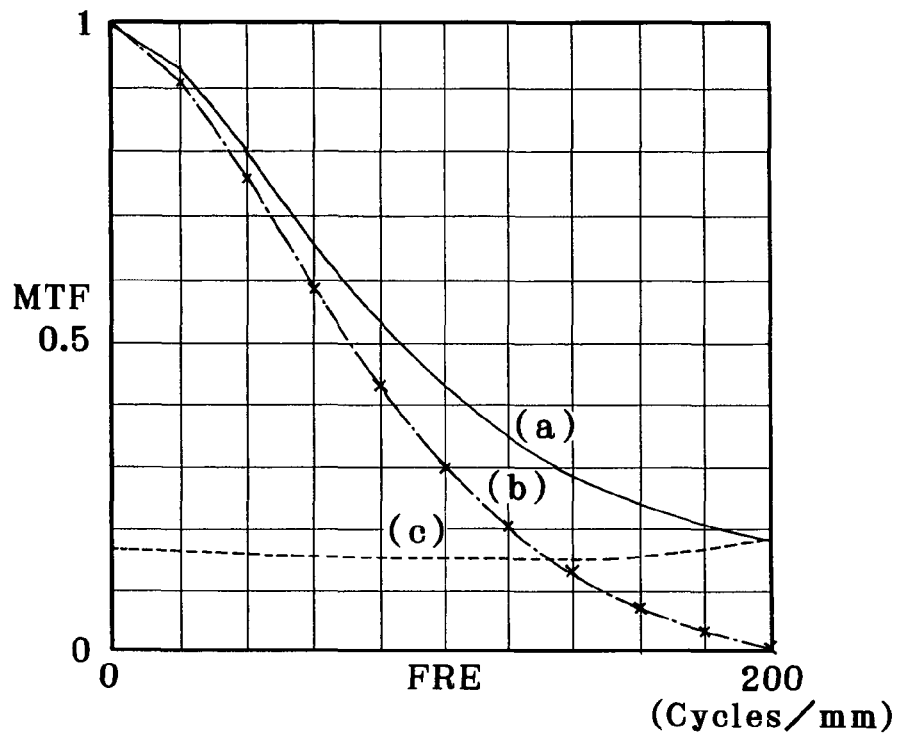
FIG. 4 is illustrative of horizontal wave optics MTF characteristics at a central area of the screen upon a full aperture at the wide-angle end.
Figure 5:
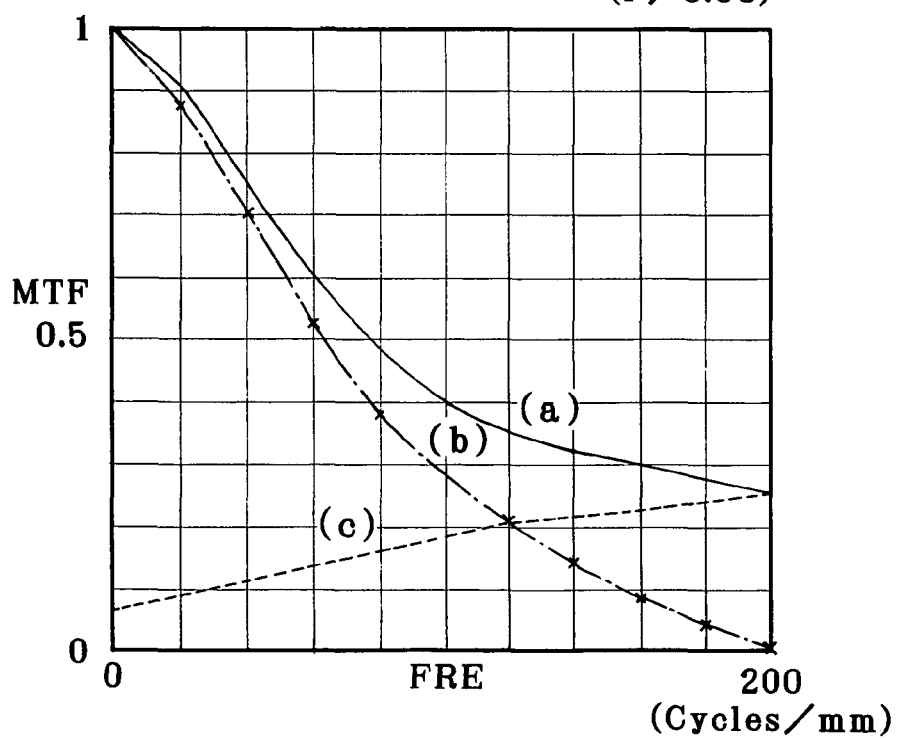
FIG. 5 is illustrative of horizontal wave optics MTF characteristics at a central area of the screen upon a full aperture at an intermediate distance.
Figure 6:
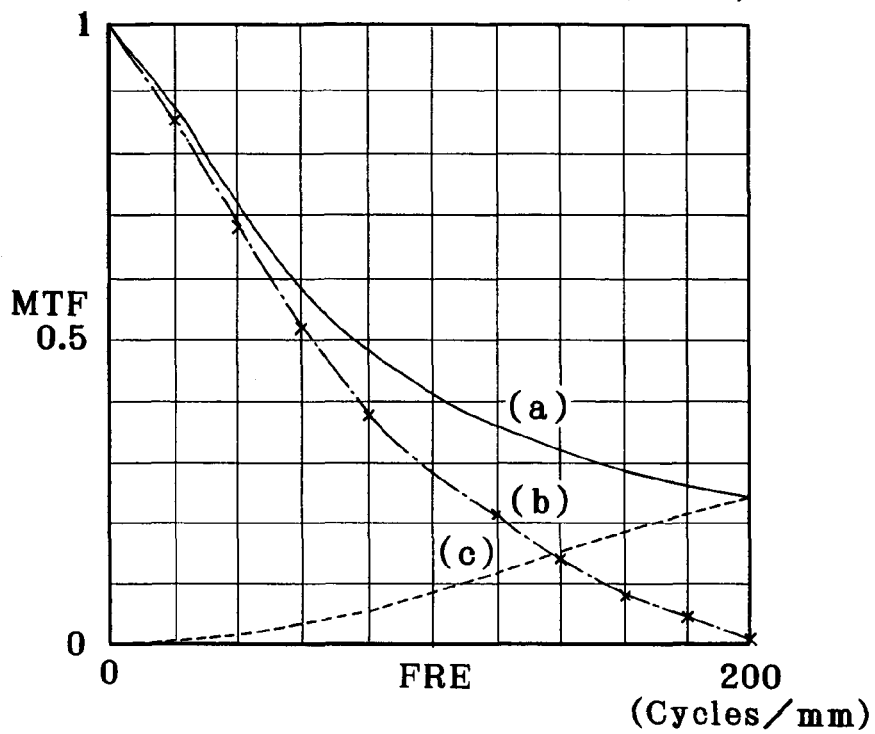
FIG. 6 is illustrative of horizontal wave optics MTF characteristics at a central area of the screen upon a full aperture at the telephoto end.
Figure 7:
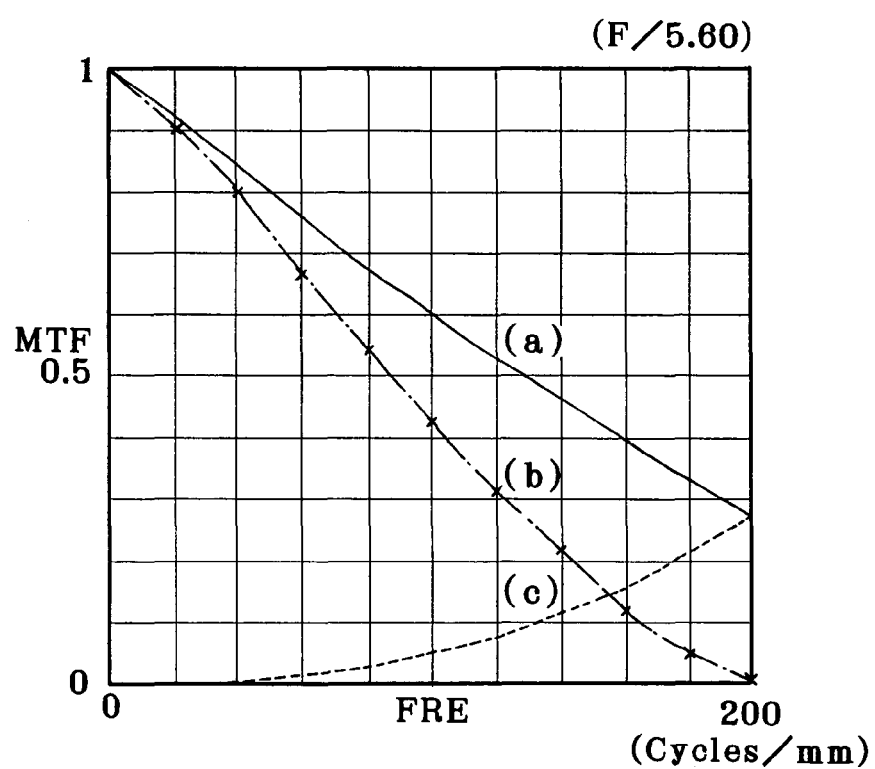
FIG. 7 is illustrative of horizontal wave optics MTF characteristics at a central area of the screen upon a two-stop aperture at the wide-angle end.
Figure 8:
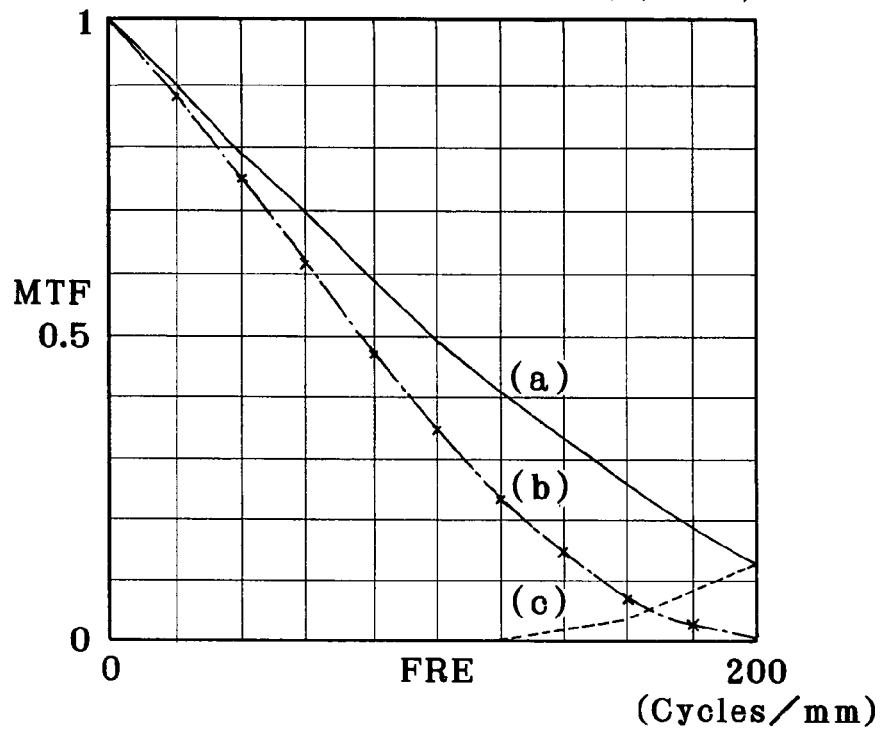
FIG. 8 is illustrative of horizontal wave optics MTF characteristics at a central area of the screen upon a two-stop aperture at an intermediate distance.
Figure 9:
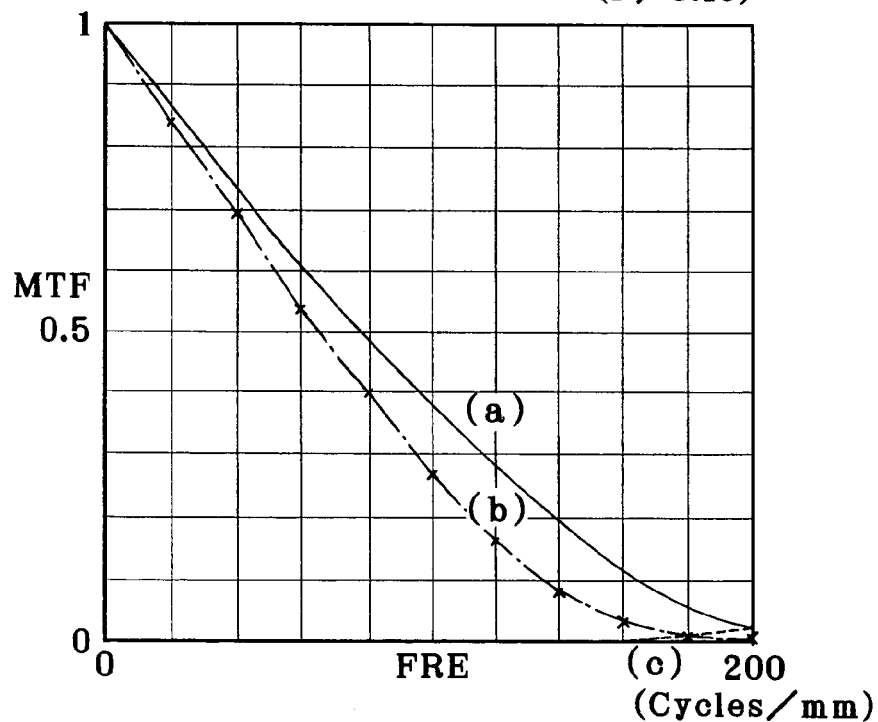
FIG. 9 is illustrative of horizontal wave optics MTF characteristics at a central area of the screen upon a two-stop aperture at the telephoto end.
Figure 10:
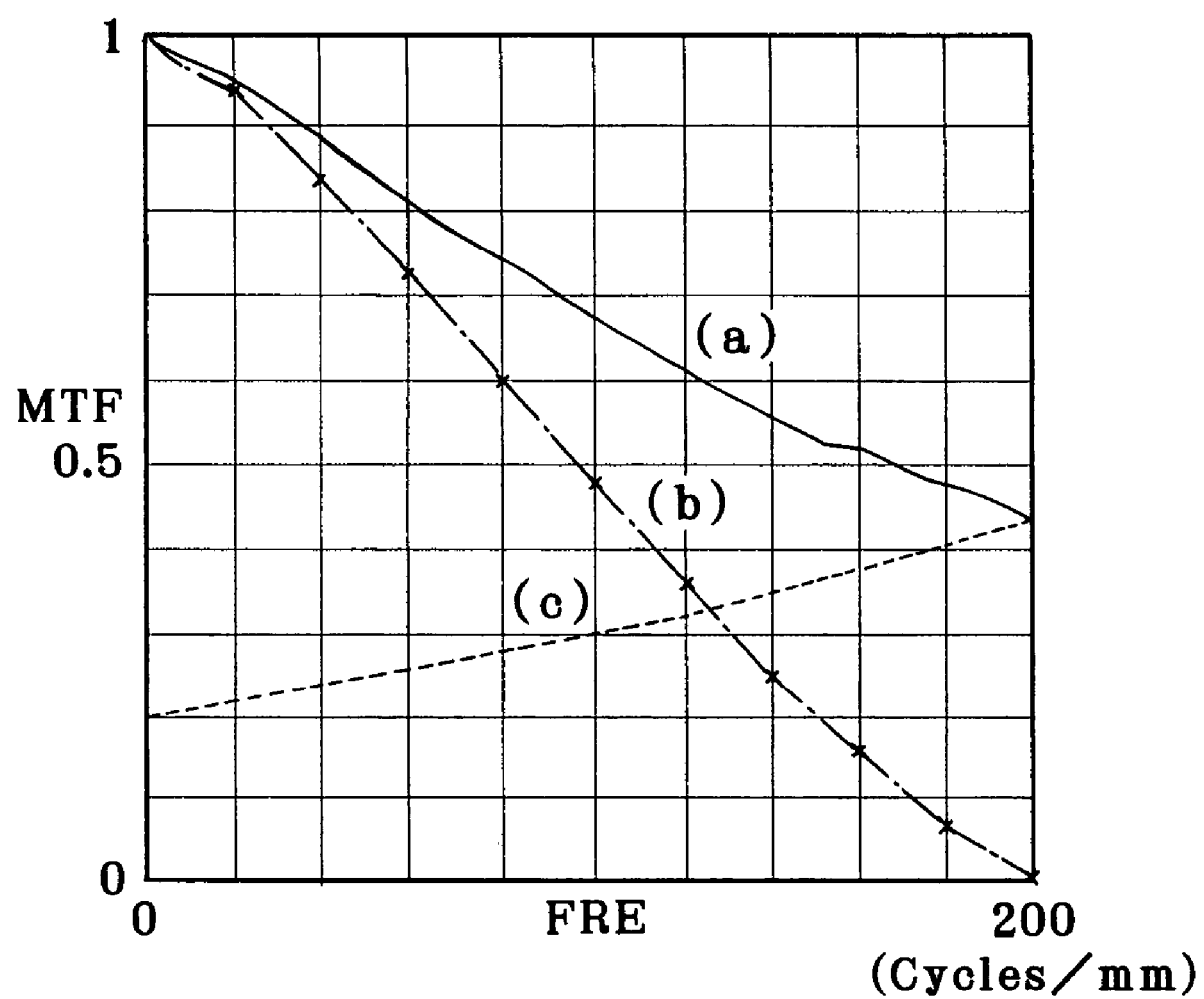
FIG. 10 is a characteristic diagram for an example where the horizontal wave optics MTF is high.

FIG. 4 is indicative of MTF at full aperture at the wide-angle end (F/2.80). FIG. 5 is illustrative of MTF at full aperture at an intermediate distance (F/3.56). FIG. 6 is illustrative of MTF at full aperture at the telephoto end (F/4.55). FIG. 7 is illustrative of MTF at a two-stop aperture at the wide-angle end (F/5.60). FIG. 8 is illustrative of MTF at a two-stop aperture at an intermediate distance (F/7.12). FIG. 9 is illustrative of MTF at a two-stop aperture at the telephoto end (F/9.10). FIG. 10 is illustrative of the case where the horizontal wave optics MTF is high.

In the MTF characteristic diagrams of FIGS. 4-10, the solid line (a) indicates horizontal MTF for the zoom lens system itself. The one-dotted line (b) indicates horizontal MTF when the zoom lens system is provided with the optical LPF. The dotted line (c) indicates horizontal alias components upon removal of the optical LPF. For MTF calculations, such a white weight as mentioned below was used at the respective wavelengths in nm.

| Wavelength (nm) | 656.28 | 587.56 | 546.07 | 486.13 | 435.84 | 404.66 |
|---|---|---|---|---|---|---|
| White Weight | 0.3 | 0.6 | 1.0 | 0.6 | 0.3 | 0.02 |

Referring to the MTF characteristics, the solid line and the one-dotted line show much the same tendency, as shown in FIGS. 4-10. In other words, there is no practical problem even with removal of the optical LPF. The reasons are now explained. Of the alias components, low-frequency components cause noises such as moiré fringes, and so an optical low-pass filter is generally inserted between an image-formation lens system and an image pickup device to remove low-frequency components from the alias components.

However, if MTF greater than the Nyquist frequency of the image-formation system is low, the alias components become low. In the present invention, two apertures in a full-aperture state and a stop-down state or one aperture in a full-aperture state are used to limit the quantity of light and allow the full-aperture F-number to satisfy F>a. It is thus easy to reduce geometrical aberrations and alias due to deterioration by diffraction; there is no practical problem even with removal of the optical LPF.

Figure 11:
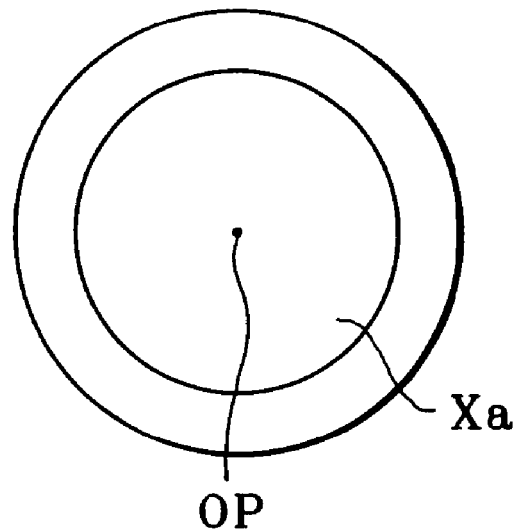
FIG. 11 is illustrative of the stop whose aperture shape is in a full-aperture state.
Figure 12:
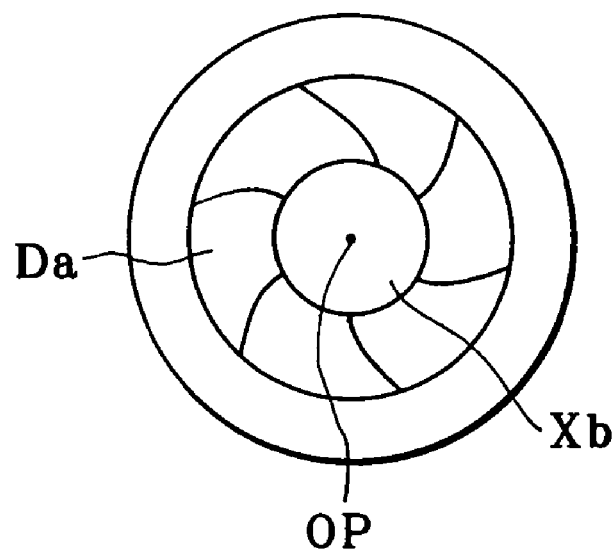
FIG. 12 is illustrative of the stop whose aperture shape is in a two-stop state.

FIG. 11 is illustrative of the shape of the stop at full aperture, and FIG. 12 is illustrative of the shape of the stop at a two-stop aperture. In FIGS. 11 and 12, OP stands for an optical axis, Da six stop plates, and Xa and Xb apertures. In the invention, the stop has only two aperture shapes, i.e., those defined by a full-aperture state (FIG. 11) and an f-stop number that is the F-number that satisfies a given condition (two-stop; FIG. 12).

In the invention, it is noted that the aperture shape of the stop that determines the F-number can remain constantly fixed. With such an arrangement using the stop of fixed shape, the thickness of the stop mechanism can be reduced. It is thus possible to make the lens-to-lens spacing with the stop interposed therein shorter than ever before and, hence, cut down the length of the zoom lens system. When the stop is of fixed diameter, a detachable ND filter may be interposed between other lens groups.

Figure 13:
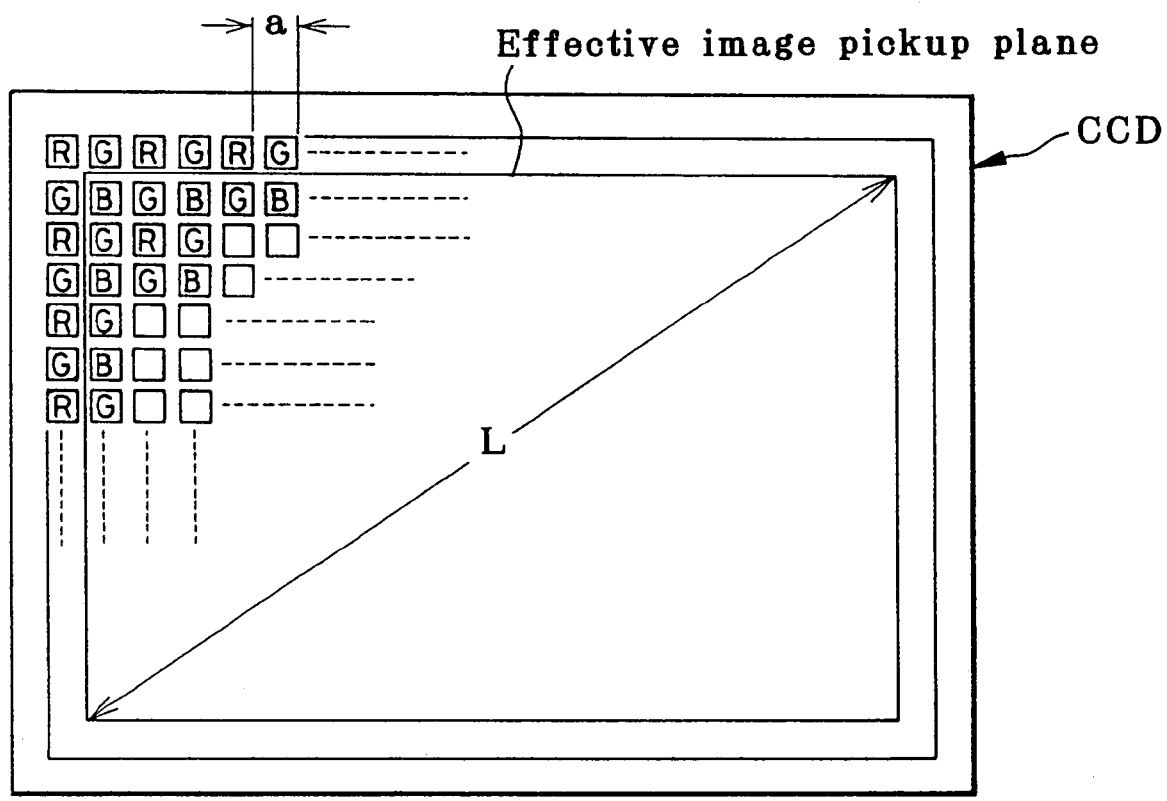
FIG. 13 is illustrative of the diagonal length of the effective image pickup plane of an electronic image pickup device upon phototaking.

Here the diagonal length L of the effective image pickup plane of the electronic image pickup device and the pixel spacing a are explained. FIG. 13 is illustrative of one exemplary pixel array for the electronic image pickup device, wherein R (red), G (green) and B (blue) pixels or four pixels, i.e., cyan, magenta, yellow and green (G) pixels (see FIG. 15) are mosaically arranged at the pixel spacing a. The "effective image pickup plane" used herein is understood to mean a certain area in the photoelectric conversion surface on an image pickup device used for the reproduction of a photo-taken image (on a personal computer or by a printer). The effective image pickup plane shown in FIG. 13 is set at an area narrower than the total photoelectric conversion surface on the image pickup device, depending on the performance of the optical system used (an image circle that can be ensured by the performance of the optical system). The diagonal length L of an effective image pickup plane is thus defined by that of the effective image pickup plane. Although the image pickup range used for image reproduction may be variable, it is noted that when the zoom lens of the present invention is used on an image pickup apparatus having such functions, the diagonal length L of its effective image pickup plane varies. In that case, the diagonal length L of the effective image pickup plane according to the present invention is defined by the maximum value in the widest possible range for L.

In the example of the invention, on the image side of the final lens group there is provided a near-infrared cut filter or a near-infrared cut coat surface. This near-infrared cut filter or near-infrared cut coat surface is designed to have a transmittance of at least 80% at 600 nm wavelength and a transmittance of up to 10% at 700 nm wavelength. More specifically, the near-infrared cut filter or the near-infrared sharp cut coat has a multilayer structure made up of such 27 layers as mentioned below; however, the design wavelength is 780 nm.

| Substrate | Material | Physical Thickness (nm) | λ/4 |
|---|---|---|---|
| 1st layer | Al$_2$O$_3$ | 58.96 | 0.50 |
| 2nd layer | TiO$_2$ | 84.19 | 1.00 |
| 3rd layer | SiO$_2$ | 134.14 | 1.00 |
| 4th layer | TiO$_2$ | 84.19 | 1.00 |
| 5th layer | SiO$_2$ | 134.14 | 1.00 |
| 6th layer | TiO$_2$ | 84.19 | 1.00 |
| 7th layer | SiO$_2$ | 134.14 | 1.00 |
| 8th layer | TiO$_2$ | 84.19 | 1.00 |
| 9th layer | SiO$_2$ | 134.14 | 1.00 |
| 10th layer | TiO$_2$ | 84.19 | 1.00 |
| 11th layer | SiO$_2$ | 134.14 | 1.00 |
| 12th layer | TiO$_2$ | 84.19 | 1.00 |
| 13th layer | SiO$_2$ | 134.14 | 1.00 |
| 14th layer | TiO$_2$ | 84.19 | 1.00 |
| 15th layer | SiO$_2$ | 178.41 | 1.33 |
| 16th layer | TiO$_2$ | 101.03 | 1.21 |
| 17th layer | SiO$_2$ | 167.67 | 1.25 |
| 18th layer | TiO$_2$ | 96.82 | 1.15 |
| 19th layer | SiO$_2$ | 147.55 | 1.05 |
| 20th layer | TiO$_2$ | 84.19 | 1.00 |
| 21st layer | SiO$_2$ | 160.97 | 1.20 |
| 22nd layer | TiO$_2$ | 84.19 | 1.00 |
| 23rd layer | SiO$_2$ | 154.26 | 1.15 |
| 24th layer | TiO$_2$ | 95.13 | 1.13 |
| 25th layer | SiO$_2$ | 160.97 | 1.20 |
| 26th layer | TiO$_2$ | 99.34 | 1.18 |
| 27th layer | SiO$_2$ | 87.19 | 0.65 |
| Air | | | |

Figure 14:
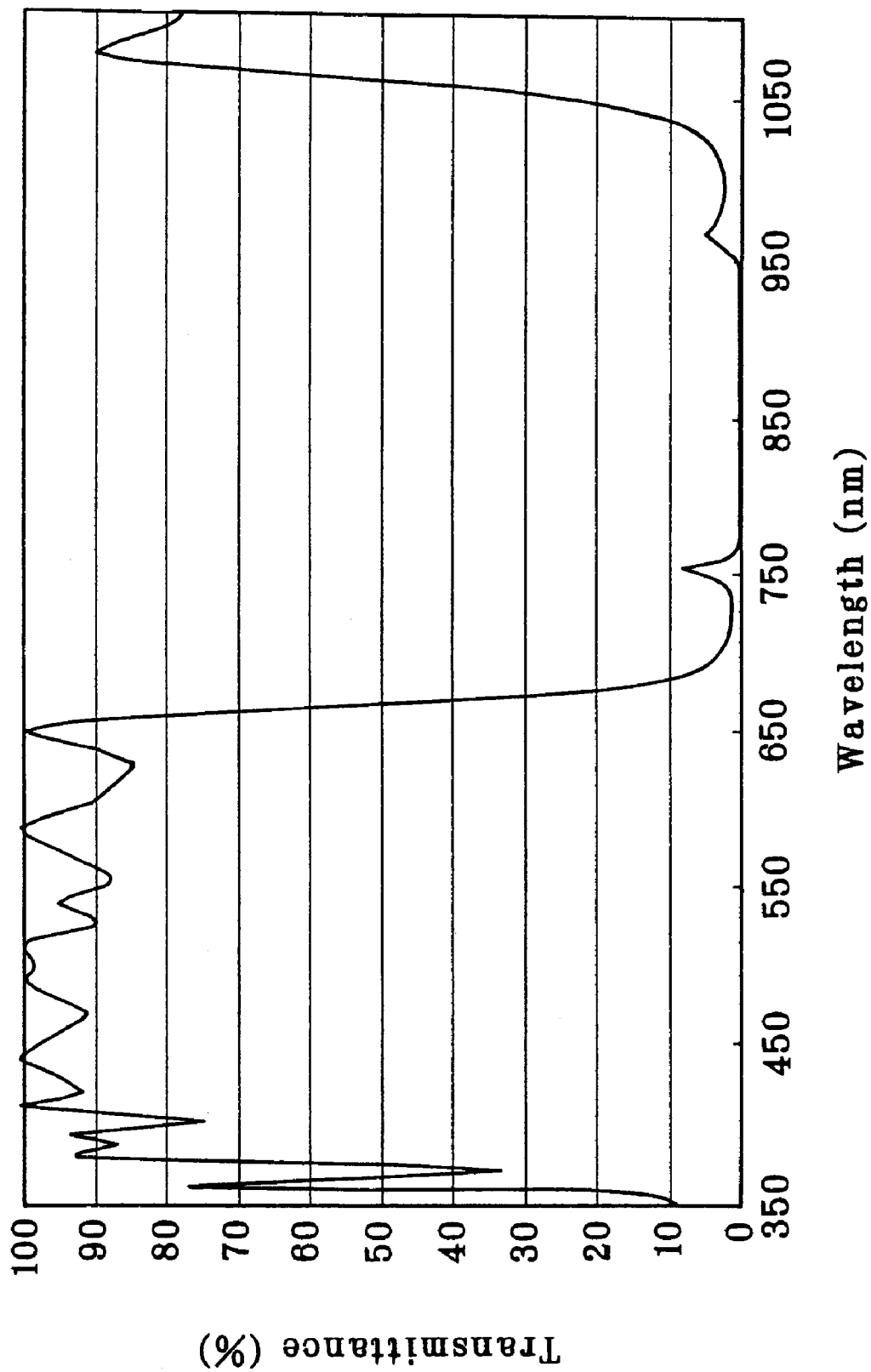
FIG. 14 is a diagram indicative of the transmittance characteristics of one example of the near-infrared sharp cut coat.

The aforesaid near-infrared sharp cut coat has such transmittance characteristics as shown in FIG. 14. To be specific, that filter or coat should preferably be designed such that the ratio of the transmittance of 420 nm wavelength with respect to the transmittance of a wavelength in the range of 400 nm to 700 nm at which the highest transmittance is found is at least 15% and that the ratio of 400 nm wavelength with respect to the highest wavelength transmittance is up to 6%. It is thus possible to reduce a discernible difference between the colors perceived by the human eyes and the colors of the image to be picked up and reproduced. In other words, it is possible to prevent image degradation due to the fact that a color of short wavelength less likely to be perceived through the human sense of sight can be readily seen by the human eyes.

Figure 15:
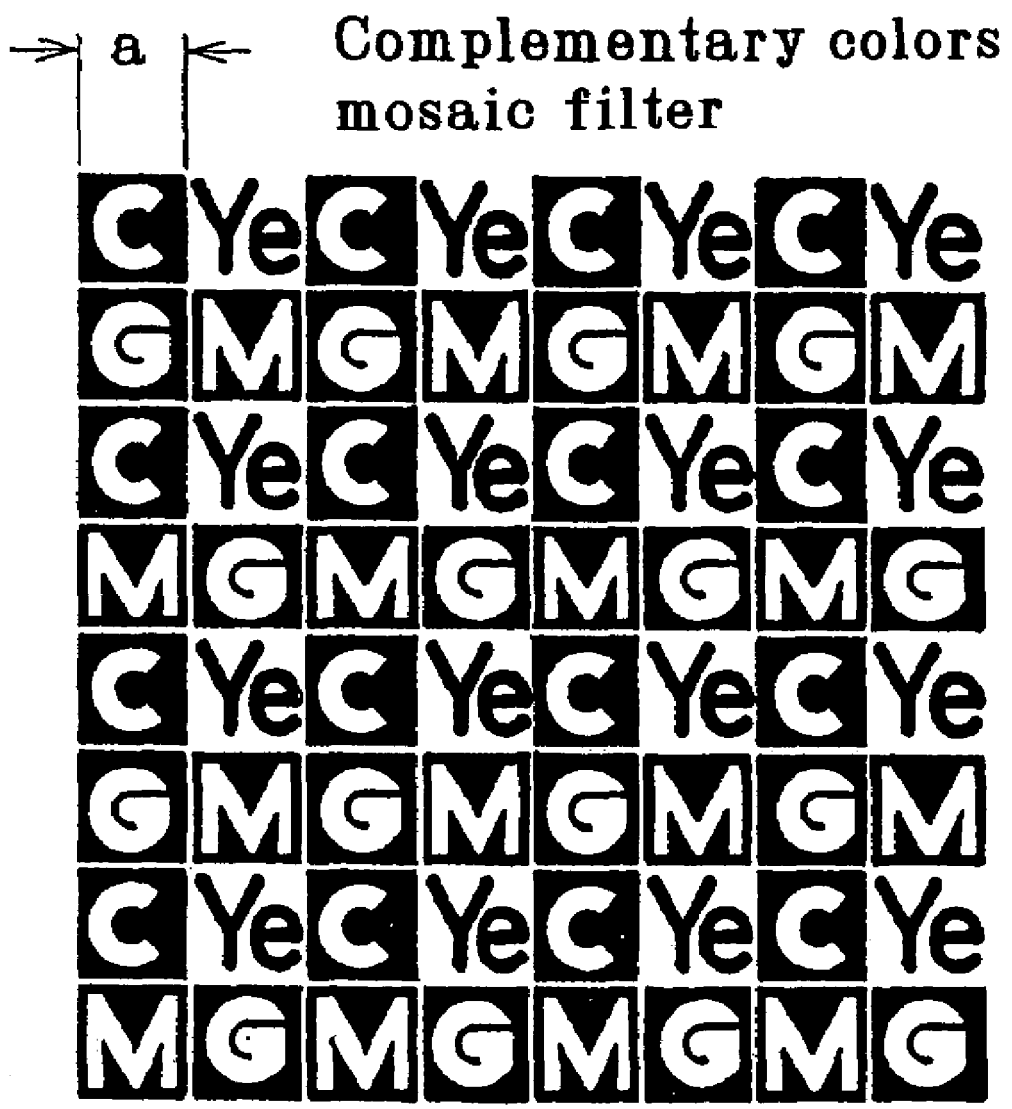
FIG. 15 is a schematic illustrative of how the color filter elements are arranged in the complementary colors mosaic filter.

When the ratio of the 400 nm wavelength transmittance is greater than 6%, the short wavelength region less likely to be perceived by the human eyes would be reproduced with perceivable wavelengths. Conversely, when the ratio of the 420 nm wavelength transmittance is less than 15%, a wavelength region perceivable by the human eyes is less likely to be reproduced, putting colors in an ill-balanced state. The image pickup plane I of a CCD is provided thereon with a complementary colors mosaic filter wherein, as shown in FIG. 15, color filter elements of four colors, cyan, magenta, yellow and green are arranged in a mosaic fashion corresponding to image pickup pixels. More specifically, these four different color filter elements, used in almost equal numbers, are arranged in such a mosaic fashion that neighboring pixels do not correspond to the same type of color filter elements, thereby ensuring more faithful color reproduction.

To be more specific, the complementary colors mosaic filter is composed of at least four different color filter elements as shown in FIG. 15, which should preferably have such characteristics as given below.

Each green color filter element G has a spectral strength peak at a wavelength $G_p$,
each yellow filter element $Y_e$ has a spectral strength peak at a wavelength $Y_p$,
each cyan filter element C has a spectral strength peak at a wavelength $C_p$, and
each magenta filter element M has spectral strength peaks at wavelengths $M_{P1}$ and $M_{P2}$, and these wavelengths satisfy the following conditions.

$$510 \text{ nm} < G_P < 540 \text{ nm}$$

$$5 \text{ nm} < Y_P - G_P < 35 \text{ nm}$$

$$-100 \text{ nm} < C_P - G_P < -5 \text{ nm}$$

$$430 \text{ nm} < M_{P1} < 480 \text{ nm}$$

$$580 \text{ nm} < M_{P2} < 640 \text{ nm}$$

To ensure higher color reproducibility, it is preferred that the green, yellow and cyan filter elements have a strength of at least 80% at 530 nm wavelength with respect to their respective spectral strength peaks, and the magenta filter elements have a strength of 10% to 50% at 530 nm wavelength with their spectral strength peak.

Figure 16:
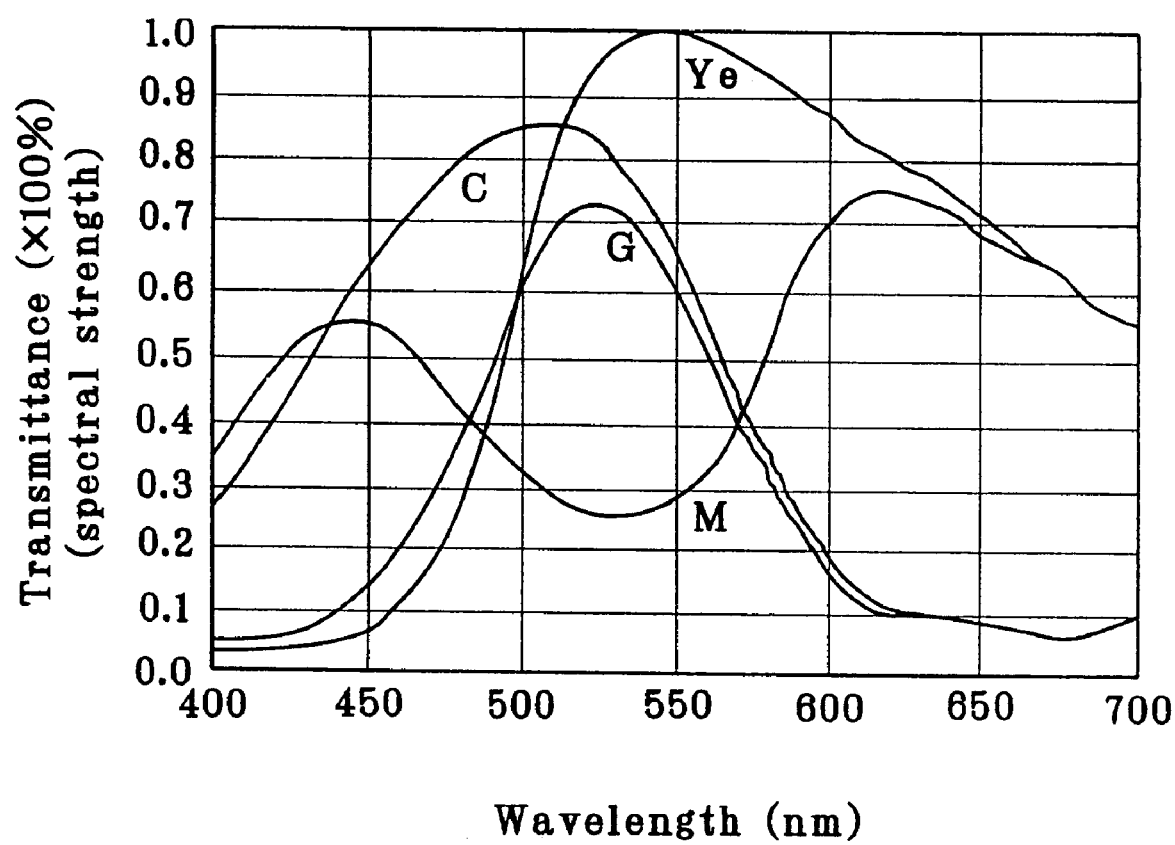
FIG. 16 is a diagram indicative of one example of the wavelength characteristics of the complementary colors mosaic filter.

One example of the wavelength characteristics in the aforesaid respective examples is shown in FIG. 16. The green filter element G has a spectral strength peak at 525 nm. The yellow filter element $Y_e$ has a spectral strength peak at 555 nm. The cyan filter element C has a spectral strength peak at 510 nm. The magenta filter element M has peaks at 445 nm and 620 nm. At 530 nm, the respective color filter elements have, with respect to their respective spectral strength peaks, strengths of 99% for G, 95% for $Y_e$, 97% for C and 38% for M.

For such a complementary colors filter, such signal processing as mentioned below is electrically carried out by means of a controller (not shown) (or a controller used with digital cameras).

For luminance signals, $$Y = |G + M + Y_e + C| \times \tfrac{1}{4}$$

For chromatic signals, $$R - Y = |(M + Y_e) - (G + C)|$$

$$B - Y = |(M + C) - (G + Y_e)|$$

Through this signal processing, the signals from the complementary colors filter are converted into R (red), G (green) and B (blue) signals. In this regard, it is noted that the aforesaid near-infrared sharp cut coat may be located anywhere on the optical path Details of the aperture stop portion in each example are shown in perspective in FIG. 17 in conjunction with a four-group arrangement, wherein the first lens group G1 excepting the optical path-bending prism P is shown. At a stop position on the optical axis between the first lens group G1 and the second lens group G2 in the image pickup optical system, there is located a turret 10 capable of brightness control at 0 stage, −1 stage, −2 stage, −3 stage and −4 stage.

The turret 10 is composed of an aperture 1A for 0 stage control, which is defined by a circular fixed space of about 4 mm in diameter (with a transmittance of 100% with respect to 550 nm wavelength), an aperture 1B for −1 stage correction, which is defined by a transparent plane-parallel plate having a fixed aperture shape with an aperture area nearly half that of the aperture 1A (with a transmittance of 99% with respect to 550 nm wavelength), and circular apertures 1C, 1D and 1E for −2, −3 and −4 stage corrections, which have the same aperture area as that of the aperture 1B and are provided with ND filters having the respective transmittances of 50%, 25% and 13% with respect to 550 nm wavelength. By turning of the turret 10 around a rotating shaft 11, any one of the apertures is located at the stop position, thereby controlling the quantity of light.

Figure 17:
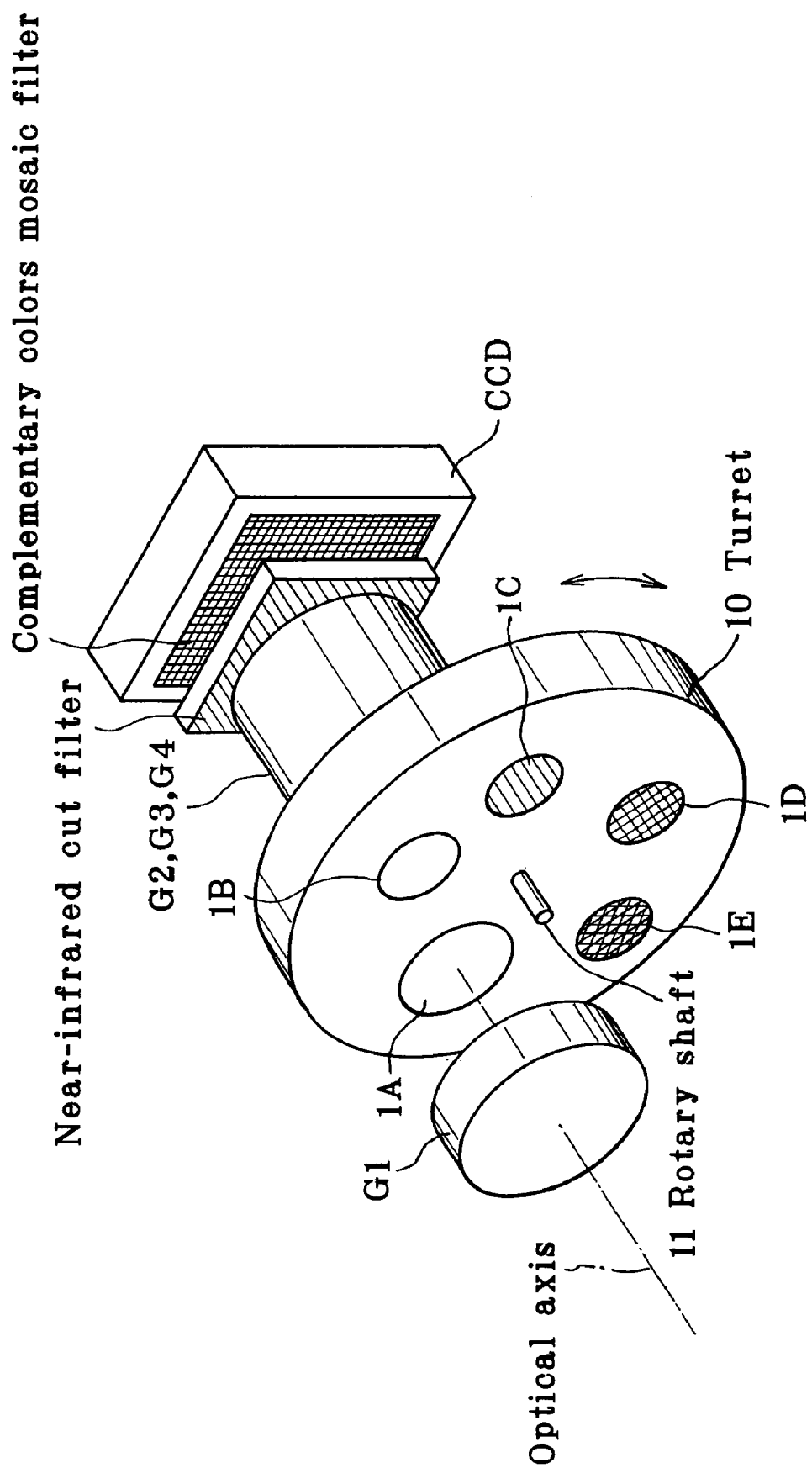
FIG. 17 is a perspective view of details of one example of the aperture stop portion used in the example.
Figure 18:
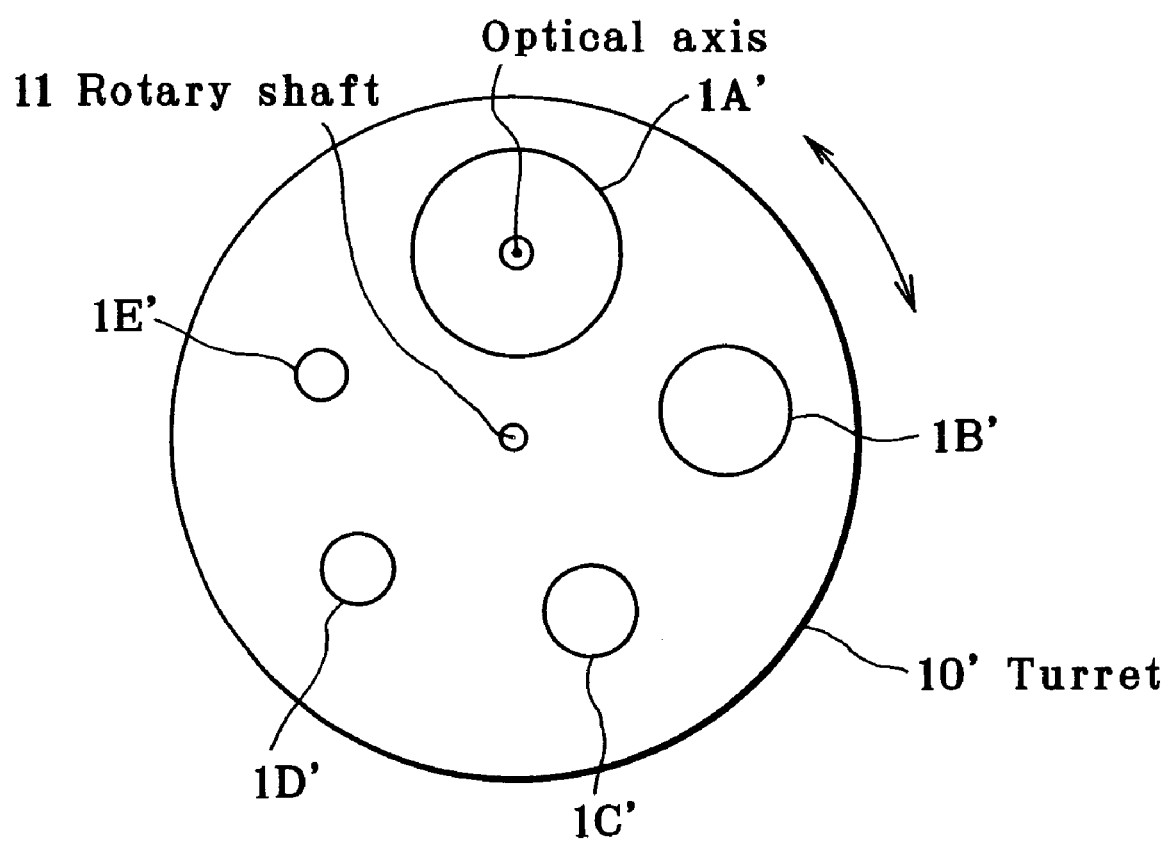
FIG. 18 is illustrative in detail of another example of the aperture stop portion used in the example.

Instead of the turret 10 shown in FIG. 17, it is acceptable to use a turret 10' shown in the front view of FIG. 18. This turret 10' capable of brightness control at 0 stage, −1 stage, −2 stage, −3 stage and −4 stage is located at the aperture stop position on the optical axis between the first lens group G1 and the second lens group G2 in the image pickup optical system. The turret 10' is composed of an aperture 1A' for 0 stage control, which is defined by a circular fixed space of about 4 mm in diameter, an aperture 1B' for −1 stage correction, which is of a fixed aperture shape with an aperture area nearly half that of the aperture 1A', and apertures 1C', 1D' and 1E' for −2, −3 and −4 stage corrections, which are of fixed shape with decreasing areas in this order. By turning of the turret 10' around a rotating shaft 11, any one of the apertures is located at the stop position thereby controlling the quantity of light.

Figure 19:
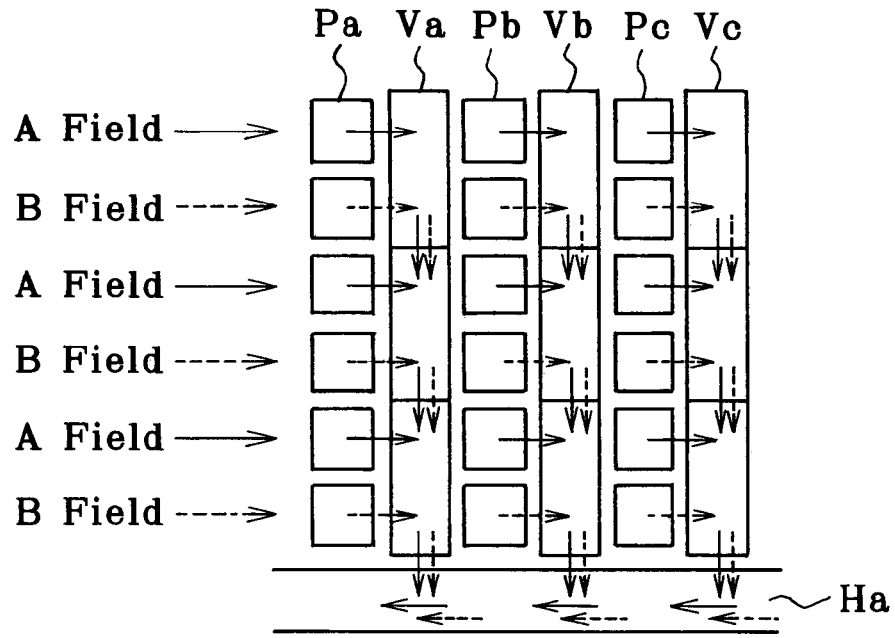
FIG. 19 is illustrative of the interlaced scanning mode of CCD image pickup operation.

In the invention, a CCD having a sequential signal reading function is used as the electronic image pickup device. CCD image pickup operation is now explained with reference to FIGS. 19 and 20. FIG. 19 is illustrative of CCD image pickup operation wherein signals are sequentially read in the interlaced scanning mode. In FIG. 19, Pa, Pb and Pc are photosensitive blocks using photodiodes, Va, Vb and Vc are CCD vertical transfer blocks, and Ha is a CCD horizontal transfer block. The A field is an odd-number field and the B field is an even-number field. In the arrangement of FIG. 19, the basic operation takes place in the following order: (1) accumulation of signal charges by light at the photosensitive block (photoelectric conversion), (2) shift of signal charges from the photosensitive block to the vertical transfer block (field shift), (3) transfer of signal charges at the vertical transfer block (vertical transfer), (4) transfer of signal charges from the vertical transfer block to the horizontal transfer block (line shift), (5) transfer of signal charges at the horizontal transfer block (horizontal transfer), and (6) detection of signal charges at the output end of the horizontal transfer block (detection). Such sequential reading may be carried out using either one of the A field (odd-number field) and the B field (even-number field).

When the interlaced scanning CCD image pickup mode of FIG. 19 is applied to TV broadcasting or analog video formats, the timing of accumulation at the A field and the B field lags by 1/60. When, with this timing lag uncorrected, a frame image is constructed as a DSC (digital spectrum compatible) image, there is blurring such as a double image in the case of a subject in motion. In this CCD image pickup mode, the A field and B field are simultaneously exposed to light to mix signals at adjacent fields. After processed by a mechanical shutter upon the completion of exposure, signals are independently read from the A field and the B field for signal synthesis.

In the invention, while the role of the mechanical shutter is limited to only prevention of smearing, signals are sequentially read out of the A field alone or signals are simultaneously read out of both the A field and the B field in a mixed fashion, so that a high-speed shutter can be released irregardless of the driving speed of the mechanical shutter (because of being controlled by an electronic shutter alone), although there is a drop of vertical resolution. The arrangement of FIG. 19 has the merit of making size reductions easy, because the number of CCDs in the vertical transfer block is half the number of photodiodes forming the photosensitive block.

Figure 20:
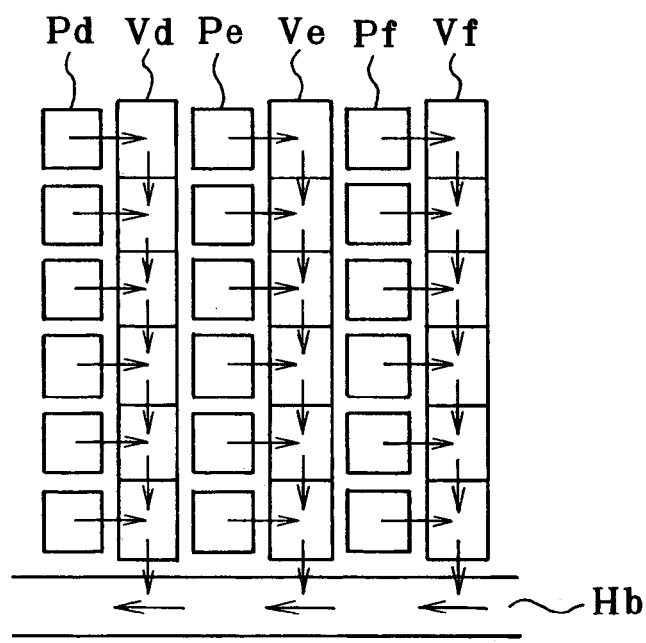
FIG. 20 is illustrative of the progressive mode of CCD image pickup operation.

FIG. 20 is illustrative of CCD image pickup operation wherein the sequential reading of signals is performed in the progressive mode. In FIG. 20, Vd, Ve and Vf are CCD vertical transfer blocks and Hb is a CCD horizontal transfer block. In FIG. 20, signals are read in order of the arranged pixels, so that charge accumulation reading operation can be all electronically controlled. Accordingly, exposure time can be cut down to about (1/10,000 second). The arrangement of FIG. 20 has the demerit of making it more difficult to achieve size reductions because of an increased number of vertical CCDs as compared with the arrangement of FIG. 19. However, the invention is applicable to the mode of FIG. 19 as well as to the mode of FIG. 20 because of such merits as mentioned above.

The present electronic imaging system constructed as described above may be applied to phototaking systems where object images formed through zoom lenses are received at image pickup devices such as CCDs or silver-halide films, inter alia, digital cameras or video cameras as well as PCs and telephone sets which are typical information processors, in particular, easy-to-carry cellular phones. Given below are some such embodiments.

Figure 21:
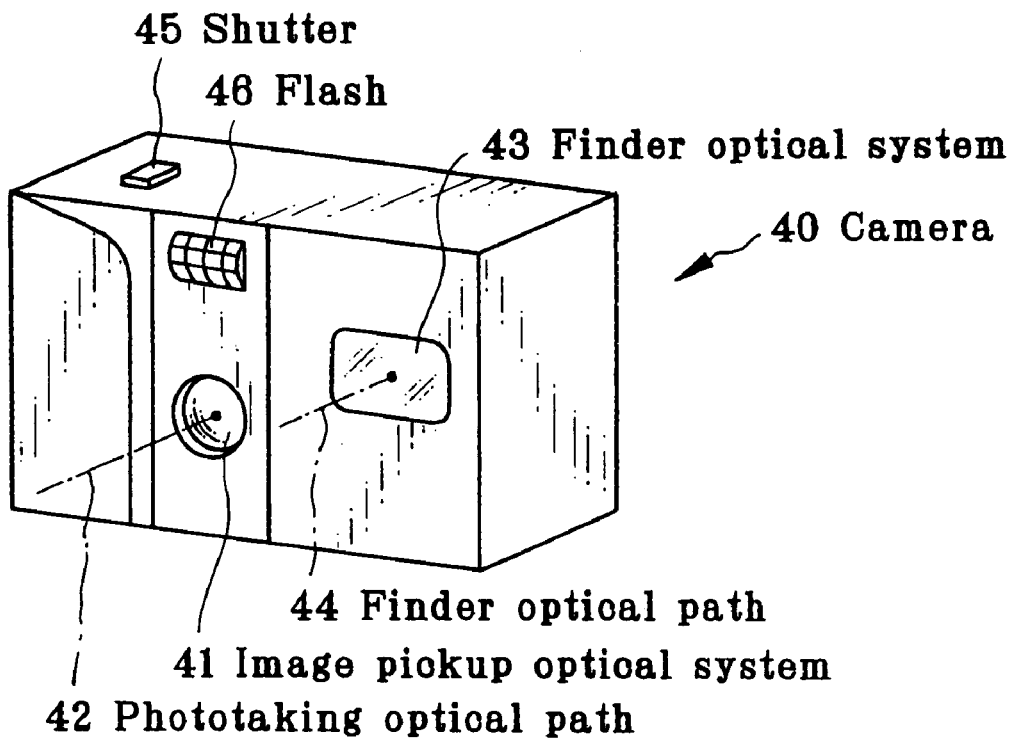
FIG. 21 is a front perspective schematic illustrative of the outside shape of a digital camera in which the optical path-bending zoom optical system of the invention is built.
Figure 22:
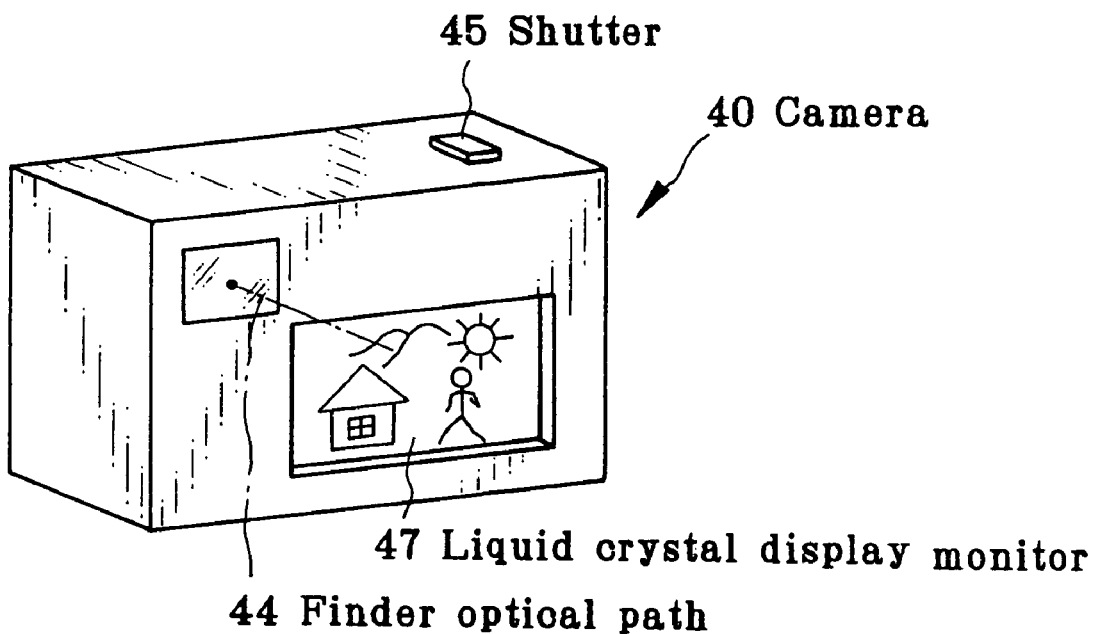
FIG. 22 is a rear perspective schematic of the digital camera of FIG. 21.
Figure 23:
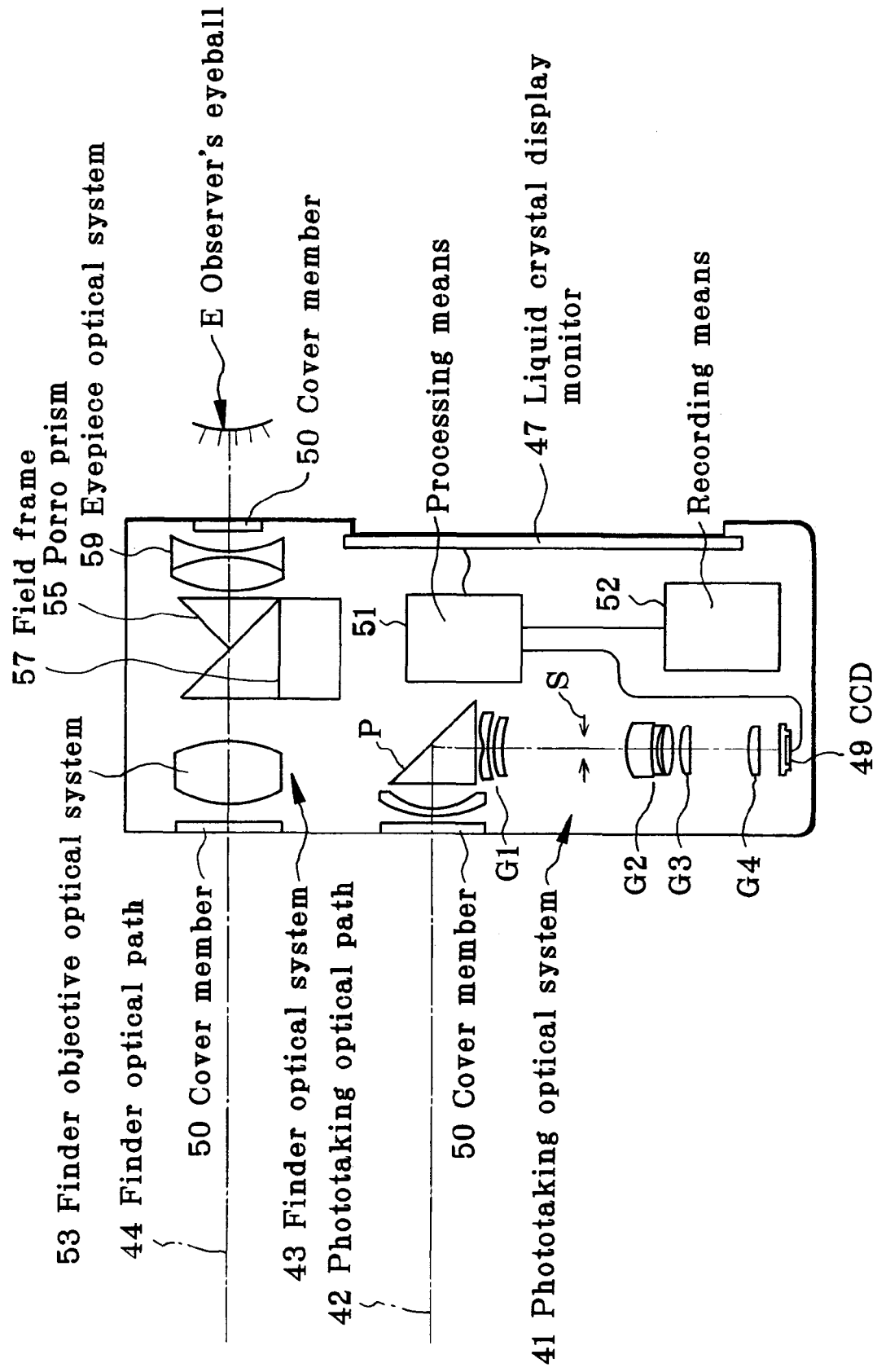
FIG. 23 is a sectional schematic of the digital camera of FIG. 21.

FIGS. 21, 22 and 23 are conceptual illustrations of a phototaking optical system 41 for digital cameras, in which the image-formation optical system of the invention is built. FIG. 21 is a front perspective view of the outside shape of a digital camera 40, and FIG. 22 is a rear perspective view of the same. FIG. 23 is a horizontally sectional view of the construction of the digital camera 40.

The digital camera 40 comprises a phototaking optical system 41 including a phototaking optical path 42, a finder optical system 43 including a finder optical path 44, a shutter 45, a flash 46, a liquid crystal monitor 47 and so on. As the shutter 45 mounted on the upper portion of the camera 40 is pressed down, phototaking takes place through the phototaking optical system 41, for instance, the optical path-bending zoom lens according to Example 1. In this case, the optical path is bent by an optical path-bending prism P in the longitudinal direction of the digital camera 40, i.e., in the lateral direction so that the camera can be slimmed down. An object image formed by the phototaking optical system 41 is formed on the image pickup plane of a CCD 49 via a near-infrared cut filter. The object image received at CCD 49 is shown as an electronic image on the liquid crystal monitor 47 via processing means 51, which monitor is mounted on the back of the camera.

This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver halide camera using a silver halide film in place of CCD 49. Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and cost reductions, because the phototaking optical system 41 is constructed of a fast zoom lens having a high zoom ratio at the wide-angle end with satisfactory aberrations and a back focus large enough to receive a filter, etc. therein. In addition, the camera can be slimmed down because, as described above, the optical path of the zoom lens is selectively bent in the longitudinal direction of the digital camera 40. With the optical path bent in the thus selected direction, the flash 46 is positioned above the entrance surface of the phototaking optical system 42, so that the influences of shadows on strobe shots of figures can be slackened. In the embodiment of FIG. 23, plane-parallel plates are used as the cover members 50; however, it is acceptable to use powered lenses. It is understood that depending on ease of camera's layout, the optical path can be bent in either one of the longitudinal and lateral directions.

Figure 24:
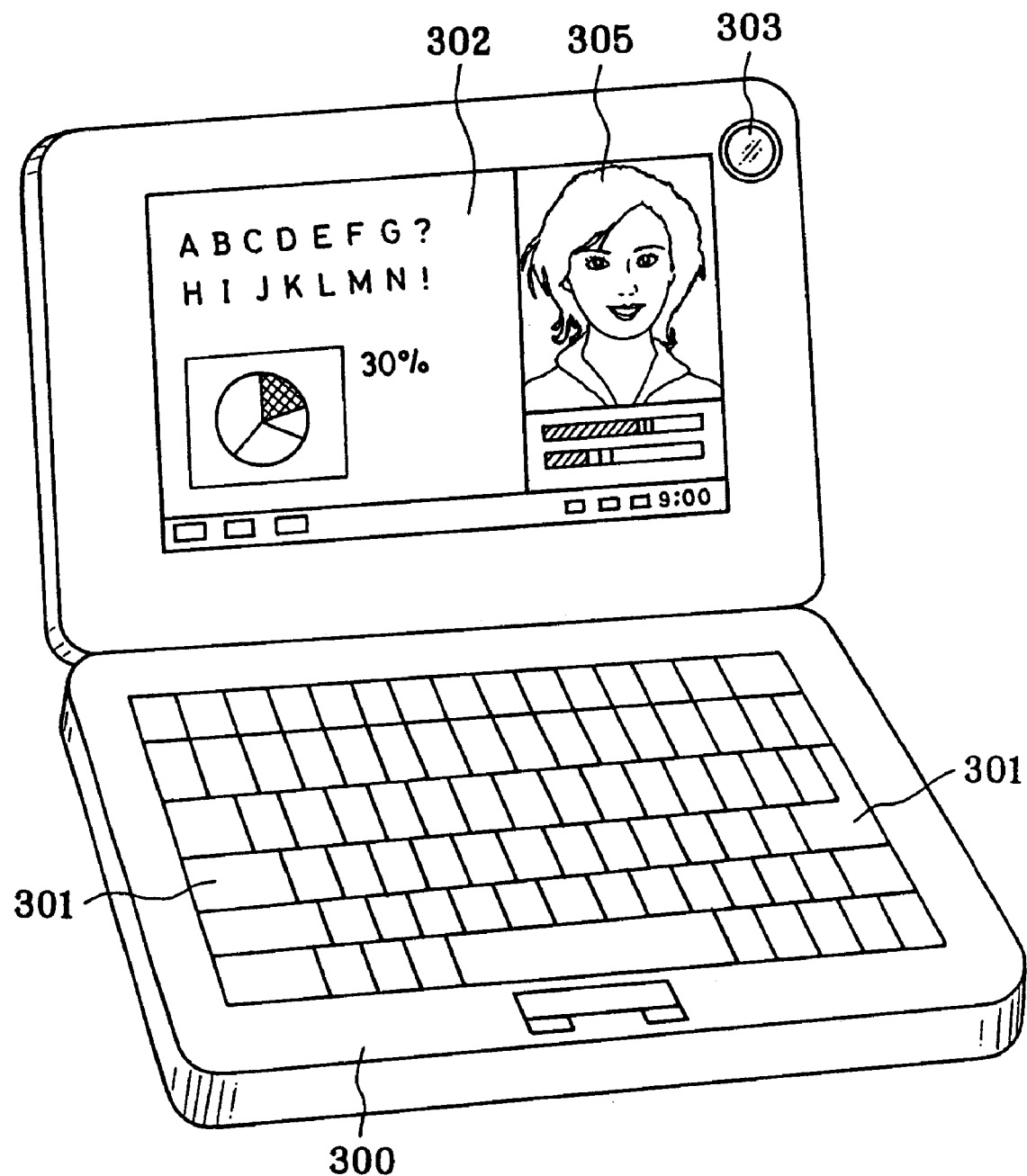
FIG. 24 is a front perspective view of a personal computer in use, in which the optical path-bending zoom optical system of the invention is built as an objective optical system.
Figure 25:
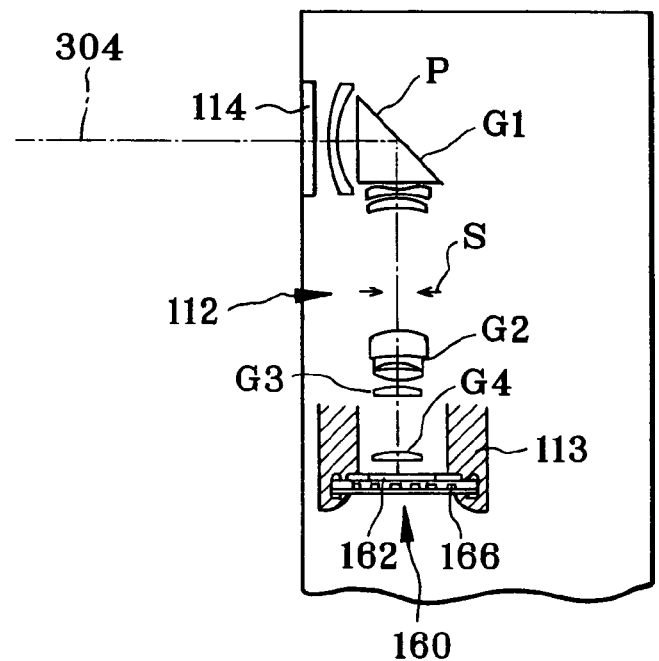
FIG. 25 is a sectional view of a phototaking optical system in the personal computer.
Figure 26:
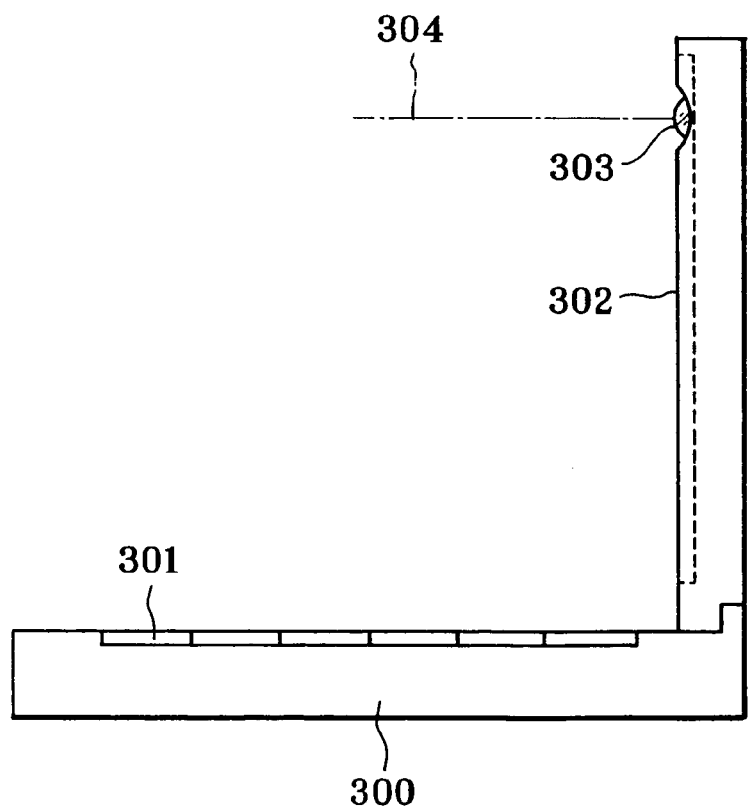
FIG. 26 is a side view of the state of FIG. 25.

FIGS. 24, 25 and 26 are illustrative of a personal computer that is one example of the information processor in which the image-formation optical system of the invention is built in as an objective optical system. FIG. 24 is a front perspective view of a personal computer 300 in use, FIG. 25 is a sectional view of a phototaking optical system 303 in the personal computer 300, and FIG. 26 is a side view of the state of FIG. 24.

As shown in FIGS. 24, 25 and 26, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images.

For the monitor 302, use may be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the right upper portion of the monitor 302, it may be located somewhere around the monitor 302 or keyboard 301. This phototaking optical system 303 comprises on a phototaking optical path 304 an objective lens 112 such as one represented by Example 1 of the optical path-bending zoom lens according to the invention and an image pickup device chip 162 for receiving an image. These are built in the personal computer 300.

Here an imaging unit 162 is provided with an image pickup device chip 160, which can be fitted into the rear end of a lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112. It is here noted that driving mechanisms for the zoom lens, etc. contained in the lens barrel 113 are not shown. An object image received at the image pickup device chip 162 is entered via a terminal 166 in the processing means of the personal computer 300, and displayed as an electronic image on the monitor 302. As an example, an image 305 taken of the operator is shown in FIG. 21. This image 305 may be displayed on a personal computer on the other end via suitable processing means and the Internet or telephone line.

Figure 27A:
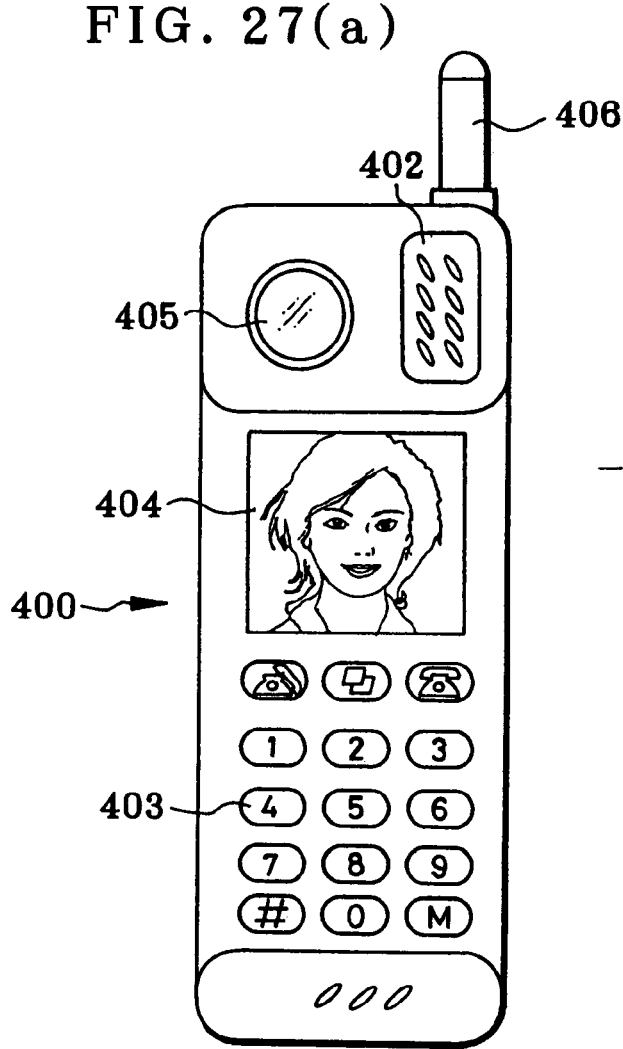
FIGS. 27(a) and 27(b) are a front and a side view of a cellular phone in which the optical path-bending zoom optical system of the 7 invention is built as an objective optical system.
Figure 27B:
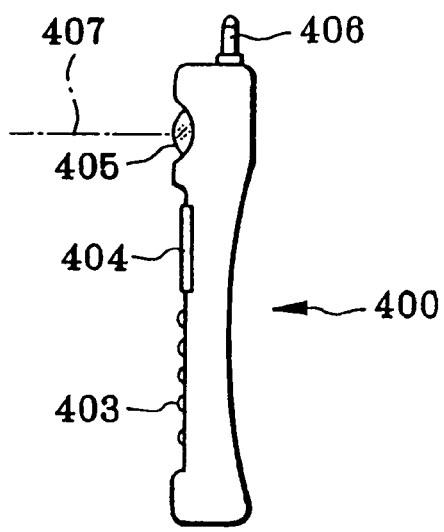
Figure 27C:
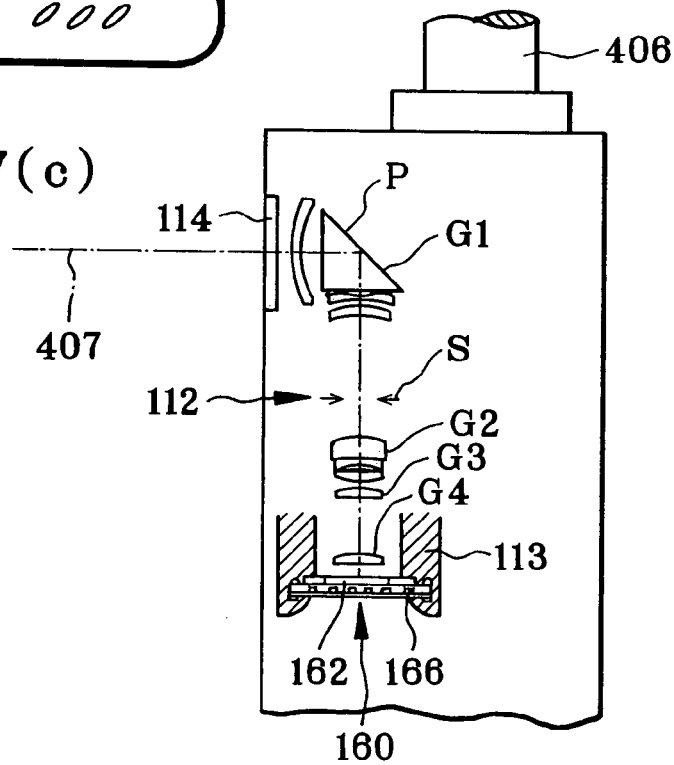

FIGS. 27(a), 27(b) and 27(c) are illustrative of a telephone set that is one example of the information processor in which the image-formation optical system of the invention is built in the form of a phototaking optical system, especially a convenient-to-carry cellular phone. FIG. 27(a) and FIG. 27(b) are a front and a side view of a cellular phone 400, respectively, and FIG. 20(c) is a sectional view of a phototaking optical system 405.

As shown in FIGS. 27(a), 27(b) and 27(c), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a phototaking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The phototaking optical system 405 comprises on a phototaking optical path 407 an objective lens 112 such as one represented by Example 1 of the optical path-bending zoom lens according to the invention and an image pickup device chip 162 for receiving an object image. These are built in the cellular phone 400.

Here an imaging unit 160 is provided with the image pickup device chip 162, which can be fitted into the rear end of a lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112. It is here noted that driving mechanisms for the zoom lens, etc. contained in the lens barrel 113 are not shown. An object image received at the image pickup device chip 162 is entered via a terminal 166 in processing means (not shown), so that the object image can be displayed as an electronic image on the monitor 404 and/or a monitor at the other end. The processing means also include a signal processing function for converting information about the object image received at the image pickup device chip 162 into transmittable signals, thereby sending the image to the person at the other end.

With the present invention, it is possible to reduce the thickness and size of electronic imaging systems such as video cameras and digital cameras while performance degradation is reduced as much as possible.

What we claim is:

1. An electronic imaging system comprising a zoom lens system and an electronic image pickup device located on an image side thereof so that an image of a subject can be formed on a photoreceptive surface of the electronic image pickup device for conversion into electric signals, wherein:

a stop has a constantly fixed aperture diameter, and
conditions (1) and (2) are satisfied:

$$a \leq 4 \, \mu m \tag{1}$$

$$F > a \tag{2}$$

where a is a horizontal pixel pitch in μm of the electronic image pickup device and F is an F-number of the zoom lens system at a wide-angle end thereof.

2. The electronic imaging system according to claim 1, wherein a medium on an optical path between the zoom lens system and the electronic image pickup device consists solely of air or a non-crystalline medium showing anisotropy.

3. The electronic imaging system according to claim 1, wherein a medium on an optical path between the zoom lens system and the electronic image pickup device consists solely of any one of air, a glass material and a plastic material.

4. An electronic imaging system comprising a zoom lens system and an electronic image pickup device located on an image side thereof so that an image of a subject can be formed on a photoreceptive surface of the electronic image pickup device for conversion into electric signals, wherein:
conditions (1') and (2) are satisfied:

$$a \leq 2.5 \, \mu m \tag{1'}$$

$$F > a \tag{2}$$

where a is a horizontal pixel pitch in μm of the electronic image pickup device and F is an F-number of the zoom lens system at its wide-angle end, and
a mode of reading signals from the electronic image pickup device has a sequential reading function.

5. The electronic imaging system according to claim 4, wherein the electronic image pickup device uses an interlaced scanning reading mode wherein an odd-number field or an even-number field is used to perform the sequential reading.

6. The electronic imaging system according to claim 4, where the electronic image pickup device uses an interlaced scanning reading mode wherein an odd-number field and an even-number field are simultaneously exposed to light to mix signals from adjacent fields, thereby performing the sequential reading.

7. The electronic imaging system according to claim 4, wherein the electronic imaging system is a CCD that uses a progressive mode as a reading mode.

8. An electronic imaging system comprising a zoom lens system and an electronic image pickup device located on an image side thereof so that an image of a subject can be formed on a photoreceptive surface of the electronic image pickup device for conversion into electric signals, wherein:
a stop has a constantly fixed aperture shape, and
conditions (1) and (2) are satisfied:

$$a \leq 4 \, \mu m \tag{1}$$

$$F > a \tag{2}$$

where a is a horizontal pixel pitch in μm of the electronic image pickup device and F is an F-number of the zoom lens system at a wide-angle end thereof; and
wherein conditions (7) and (8) are satisfied:

$$\tau_{600}/\tau_{550} \geq 0.8 \tag{7}$$

$$\tau_{700}/\tau_{550} \leq 0.08 \tag{8}$$

where $\tau_{550}$, $\tau_{600}$, and $\tau_{700}$ are transmittance values at 550, 600, and 700 nm wavelengths, respectively.

9. An electronic imaging system comprising a zoom lens system and an electronic image pickup device located on an image side thereof so that an image of a subject can be formed on a photoreceptive surface of the electronic image pickup device for conversion into electric signals, wherein:
conditions (1) and (2) are satisfied:

$$a \leq 4 \, \mu m \tag{1}$$

$$F > a \tag{2}$$

where a is a horizontal pixel pitch in μm of the electronic image pickup device and F is an F-number of the zoom lens system at its wide-angle end, and
a mode of reading signals from the electronic image pickup device has a sequential reading function; and
wherein conditions (7) and (8) are satisfied:

$$\tau_{600}/\tau_{550} \geq 0.8 \tag{7}$$

$$\tau_{700}/\tau_{550} \leq 0.08 \tag{8}$$

where $\tau_{550}$, $\tau_{600}$, and $\tau_{700}$ are transmittance values at 550, 600, and 700 nm wavelengths, respectively.

10. An electronic imaging system comprising a zoom lens system and an electronic image pickup device located on an image side thereof so that an image of a subject can be formed on a photoreceptive surface of the electronic image pickup device for conversion into electric signals, wherein:
a stop has a constantly fixed aperture shape, and
conditions (1') and (2) are satisfied:

$$a \leq 2.5 \, \mu m \tag{1'}$$

$$F > a \tag{2}$$

where a is a horizontal pixel pitch in μm of the electronic image pickup device and F is an F-number of the zoom lens system at a wide-angle end thereof.

* * * * *